US011899176B2

(12) United States Patent
Yao

(10) Patent No.: US 11,899,176 B2
(45) Date of Patent: Feb. 13, 2024

(54) WIDE FIELD OF VIEW FIVE ELEMENT LENS SYSTEM

(71) Applicant: Apple Inc., Cupertino, CA (US)

(72) Inventor: Yuhong Yao, Cupertino, CA (US)

(73) Assignee: Apple Inc., Cupertino, CA (US)

(*) Notice: Subject to any disclaimer, the term of this patent is extended or adjusted under 35 U.S.C. 154(b) by 514 days.

(21) Appl. No.: 17/175,431

(22) Filed: Feb. 12, 2021

(65) Prior Publication Data

US 2021/0165194 A1 Jun. 3, 2021

Related U.S. Application Data

(63) Continuation of application No. 16/120,142, filed on Aug. 31, 2018, now Pat. No. 10,921,558.

(60) Provisional application No. 62/577,679, filed on Oct. 26, 2017.

(51) Int. Cl.
G02B 13/00 (2006.01)
G02B 13/04 (2006.01)
H04N 23/55 (2023.01)
G02B 9/60 (2006.01)
G02B 5/20 (2006.01)
G02B 7/09 (2021.01)

(52) U.S. Cl.
CPC ........... *G02B 13/0045* (2013.01); *G02B 9/60* (2013.01); *G02B 13/04* (2013.01); *H04N 23/55* (2023.01); *G02B 5/208* (2013.01); *G02B 7/09* (2013.01)

(58) Field of Classification Search
CPC ...... G02B 13/0045; G02B 9/60; G02B 13/04; G02B 5/208; G02B 7/09; G02B 5/281; G02B 13/18; H04N 23/55; G03B 30/00
See application file for complete search history.

(56) References Cited

U.S. PATENT DOCUMENTS

| 8,599,495 | B1* | 12/2013 | Tsai | H04N 23/55 |
| | | | | 359/755 |
| 8,908,290 | B1 | 12/2014 | Liao et al. | |
| 9,182,572 | B2 | 11/2015 | Lin et al. | |
| 9,207,435 | B2 | 12/2015 | Tsai et al. | |
| 9,958,650 | B1 | 5/2018 | Gong et al. | |
| 10,921,558 | B2 | 2/2021 | Yao | |

(Continued)

FOREIGN PATENT DOCUMENTS

| CN | 102566016 | 7/2012 |
| CN | 103412394 | 11/2013 |

(Continued)

OTHER PUBLICATIONS

International Search Report and Written Opinion from PCT/US2018/056566, dated Jan. 16, 2019, pp. 1-12.

(Continued)

*Primary Examiner* — Yogesh K Aggarwal

(74) *Attorney, Agent, or Firm* — Robert C. Kowert; Kowert, Hood, Munyon, Rankin & Goetzel, P.C.

(57) ABSTRACT

Lens systems are described that may be used in small form factor cameras. An imaging lens system may include a front aperture and five lens elements, and provides a low F-number (<=2.4), wide field of view (>=82 degrees), and short total track length (TTL). Lens system parameters and relationships may be selected at least in part to reduce, compensate, or correct for optical aberrations and lens artifacts and effects across the field of view.

20 Claims, 26 Drawing Sheets

(56) References Cited

U.S. PATENT DOCUMENTS

| | | |
|---|---|---|
| 2012/0092544 A1 | 4/2012 | Noda |
| 2012/0162784 A1 | 6/2012 | Tang et al. |
| 2012/0300316 A1 | 11/2012 | Tsai et al. |
| 2013/0027785 A1 | 1/2013 | Kim et al. |
| 2013/0265650 A1 | 10/2013 | Chen et al. |
| 2013/0279021 A1 | 10/2013 | Chen et al. |
| 2014/0285710 A1 | 9/2014 | Chen et al. |
| 2015/0098011 A1 | 4/2015 | Huang |
| 2015/0098136 A1 | 4/2015 | Hashimoto |
| 2015/0116569 A1 | 4/2015 | Mercado |
| 2015/0168695 A1* | 6/2015 | Tsai ............... G02B 9/60 348/360 |
| 2015/0212389 A1 | 7/2015 | Chen et al. |
| 2016/0252709 A1 | 9/2016 | Lin et al. |
| 2016/0274334 A1* | 9/2016 | Lee ............... G02B 13/0045 |
| 2017/0102521 A1 | 4/2017 | Son |
| 2017/0153424 A1 | 6/2017 | Kim |
| 2017/0322391 A1 | 11/2017 | Kang et al. |
| 2018/0017764 A1 | 2/2018 | Kang et al. |
| 2018/0039046 A1 | 2/2018 | Lee et al. |
| 2019/0025551 A1 | 1/2019 | Kuo |
| 2020/0150397 A1 | 5/2020 | Fukaya et al. |

FOREIGN PATENT DOCUMENTS

| | | |
|---|---|---|
| CN | 203773138 U | 8/2014 |
| CN | 104597586 | 5/2015 |
| CN | 104730695 A | 6/2015 |
| CN | 205229553 U | 5/2016 |
| CN | 106802465 | 6/2017 |
| CN | 104765129 A | 7/2017 |
| EP | 1840619 | 10/2007 |
| JP | 2015087495 A | 5/2015 |
| KR | 10-2016-0112307 A | 9/2016 |

OTHER PUBLICATIONS

Office action from European Application No. 18797447.2-1020, dated Oct. 27, 2022, pp. 1-10.
Office Action dated Jun. 24, 2021 in Chinese Patent Application No. 201880069511.5, Apple Inc.
Office Action dated Aug. 10, 2021 in Korean Patent Application No. 10-2020-7011794, Apple Inc.
Office Action and Search Report dated Sep. 13, 2022, in Chinese Patent Application No. 201880069511.5, Apple Inc., pp. 1-5.
Office action from Korean Application No. 10-2022-7014779 (including English translation), dated Jan. 13, 2023, pp. 1-15.
Office action from Korean Application No. 10-2022-7014779 (including English translation of Allowed Claims), dated Aug. 8, 2023, pp. 1-11.

* cited by examiner

WIDE FIELD OF VIEW FIVE ELEMENT LENS SYSTEM

This application is a continuation of U.S. patent application Ser. No. 16/120,142, filed Aug. 31, 2018, which claims benefit of priority to U.S. Provisional Application Ser. No. 62/577,679, filed Oct. 26, 2017, and which are incorporated herein by reference in their entirety.

BACKGROUND

Technical Field

This disclosure relates generally to camera systems, and more specifically to small form factor camera and lens systems.

Description of the Related Art

The advent of small, mobile multipurpose devices such as smartphones and tablet or pad devices has resulted in a need for high-resolution, small form factor cameras that are lightweight, compact, and capable of capturing high resolution, high quality images at low F-numbers for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens systems with improved imaging quality performance has increased. In addition, there are increasing expectations for small form factor cameras to be equipped with higher pixel count and/or larger pixel size image sensors (one or both of which may require larger image sensors) while still maintaining a module height that is compact enough to fit into portable electronic devices. Thus, a challenge from an optical system design point of view is to provide an imaging lens system that is capable of capturing high brightness, high resolution images under the physical constraints imposed by small form factor cameras.

SUMMARY OF EMBODIMENTS

Embodiments of the present disclosure may provide an imaging lens system including a front aperture and five lens elements that may, for example, be used in a compact camera and that provide a low F-number (<=2.4), wide field of view (>=82 degrees), and short total track length (TTL) that allow the camera to be implemented in a small package size while still capturing sharp, high-resolution images, making embodiments of the camera suitable for use in small and/or mobile multipurpose devices. Embodiments of the lens system include five lens elements with refractive power arranged along an optical axis from a first lens element on the object side to a fifth lens on the image side. The lens system includes a front aperture stop located at the first lens element at or behind the front vertex of the lens system.

Lens system parameters and relationships including but not limited to lens shape, thickness, geometry, position, materials, spacing, and the surface shapes of certain lens elements may be selected at least in part to reduce, compensate, or correct for optical aberrations and lens artifacts and effects across the field of view.

In some embodiments, the lens system may include an infrared (IR) filter to reduce or eliminate interference of environmental noise on the photosensor. The IR filter may, for example, be located between the fifth lens element and a photosensor. In some embodiments, a cover glass may be located on the object side of the lens system. In some embodiments, the cover glass may have a small amount of refractive power. In some embodiments, the lens system is a fixed-focus lens. However, in some embodiments, the camera may include an optical actuator component located in front of the lens system that provides autofocus (AF) functionality for the camera.

Figure 1:
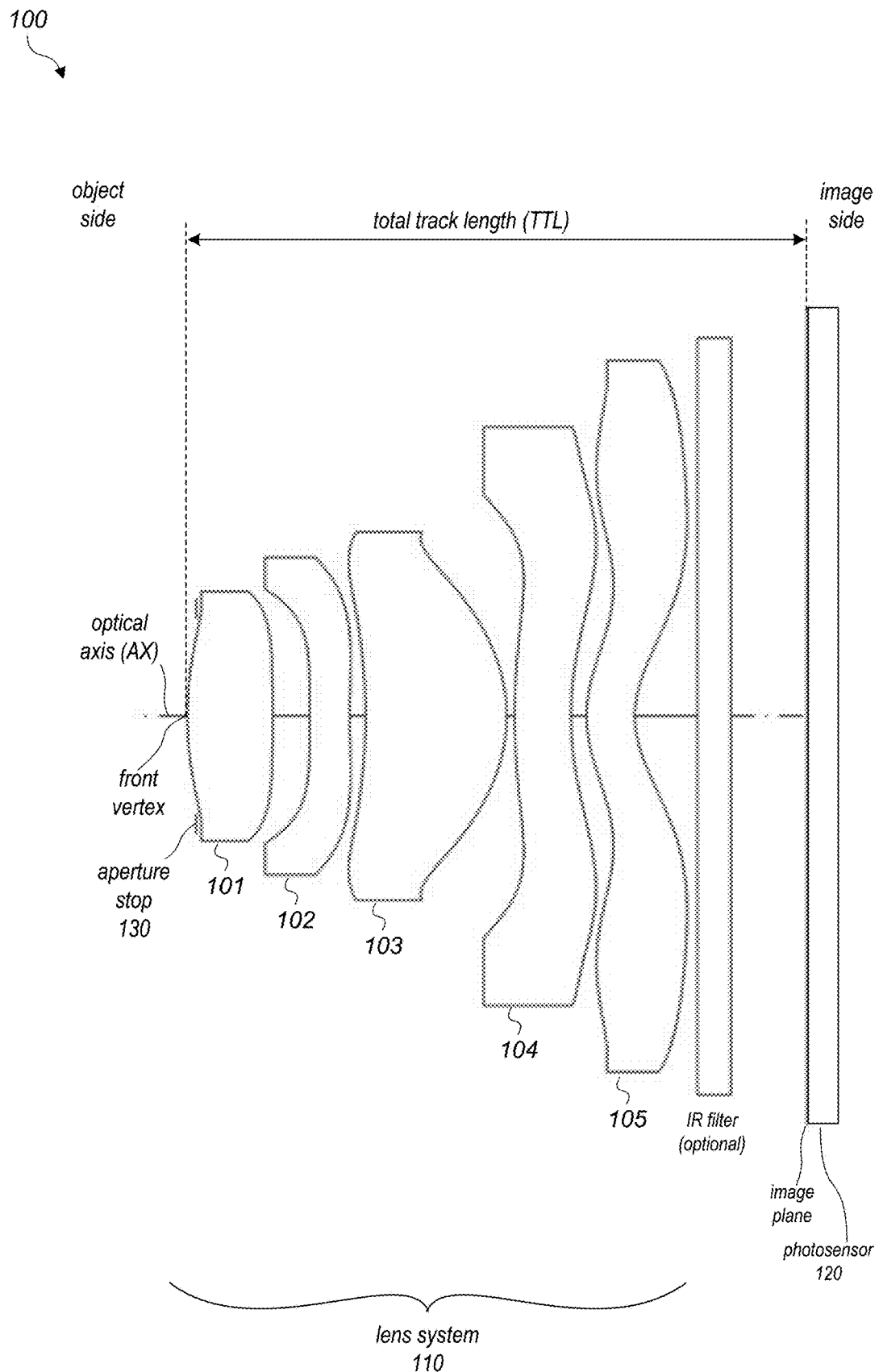
FIG. 1 is a cross-sectional illustration of a lens system that includes five lens elements and a front aperture and that provide a low F-number (<=2.4), wide field of view (>=82 degrees), and short total track length (TTL), according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of a small form factor camera including a photosensor and a lens system are described. Embodiments of an imaging lens system including a front aperture and five lens elements that may be used in the camera and that provide a low F-number (<=2.4), wide field of view (>=82 degrees) and short total track length (TTL) that allow the camera to be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the camera (e.g., the lens system and photosensor) may be scaled up or down to provide cameras with larger or smaller package sizes than those described. In addition, embodiments of the camera system may be implemented as stand-alone digital cameras. In addition to still (single frame capture) camera applications, embodiments of the camera system may be adapted for use in video camera applications. Embodiments of the lens system may be used in small form factor cameras to capture high brightness, high resolution images with a low F-number and wide field of view.

FIG. 1 is a cross-sectional illustration of a lens system that includes five lens elements and a front aperture and that provide a low F-number (<=2.4), wide field of view (>=82 degrees), and short total track length (TTL), according to some embodiments. As shown in FIG. 1, an example camera 100 includes at least a lens system 110 and a photosensor 120. Embodiments of the lens system 110 include five lens elements 101-105 (also referred to as L1-L5) with refractive power arranged along an optical axis (AX) from a first lens element 101 on the object side to a fifth lens element 105 on the image side. The aperture stop 130 is located at the first lens element 101 at or behind the front vertex of the lens system 110. Lens system parameters and relationships including but not limited to power distribution, lens shape, thickness, geometry, position, materials, spacing, and the surface shapes of certain lens elements may be selected at least in part to reduce, compensate, or correct for optical aberrations and lens artifacts and effects across the field of view including one or more of but not limited to vignetting, chromatic aberration, the field curvature or Petzval sum, and lens flare.

Referring again to FIG. 1, the refractive lens elements in embodiments of the lens system 110 may, for example, be composed of a plastic material. In some embodiments, the refractive lens elements may be composed of an injection molded plastic material. However, other transparent materials (e.g., glass) may be used. Also note that, in a given embodiment, different ones of the lens elements may be composed of materials with different optical characteristics, for example different Abbe numbers and/or different refractive indices. The Abbe number, $V_d$, may be defined by the equation:

$$V_d = (N_d - 1)/(N_F - N_C)$$

where $N_F$ and $N_C$ are the refractive index values of the material at the F and C lines of hydrogen, respectively. In some embodiments, lens elements 102 and 104 may be composed of a material with a relatively low Abbe number ($15 < V_d < 30$), and lens elements 101, 103, and 105 may be composed of a material with a relatively high Abbe number ($45 < V_d < 70$).

The photosensor 120 may be an integrated circuit (IC) technology chip or chips implemented according to any of various types of photosensor technology. Examples of photosensor technology that may be used are charge-coupled device (CCD) technology and complementary metal-oxidesemiconductor (CMOS) technology. In some embodiments, pixel size of the photosensor 120 may be 1.2 microns or less, although larger pixel sizes may be used. In a non-limiting example embodiment, the photosensor 120 may be manufactured according to a 1280×720 pixel image format to capture 1 megapixel images. However, other pixel formats may be used in embodiments, for example 5 megapixel, 10 megapixel, or larger or smaller formats. In the non-limiting example embodiments described herein, an example photosensor with a semi-diagonal image height within a range of 2.0 to 2.7 mm may be used; however, larger or smaller photosensors may be used with appropriate adjustment of the lens system dimensions.

The lens system 110 may also include a front aperture stop located at the first lens element at or behind the front vertex of the lens system.

The camera 100 may also, but does not necessarily, include an infrared (IR) filter, for example located between the last or fifth lens element 105 of the lens system 110 and the photosensor 120. The IR filter may, for example, be composed of a glass material. However, other materials may be used. In at least some embodiments, the IR filter does not have refractive power, and does not affect the effective focal length f of the lens system. In some embodiments, instead of an IR filter as shown in the Figures, a coating may be used on one or more of the lens elements, or other methods may be used, to provide IR filtering.

Figure 7A:
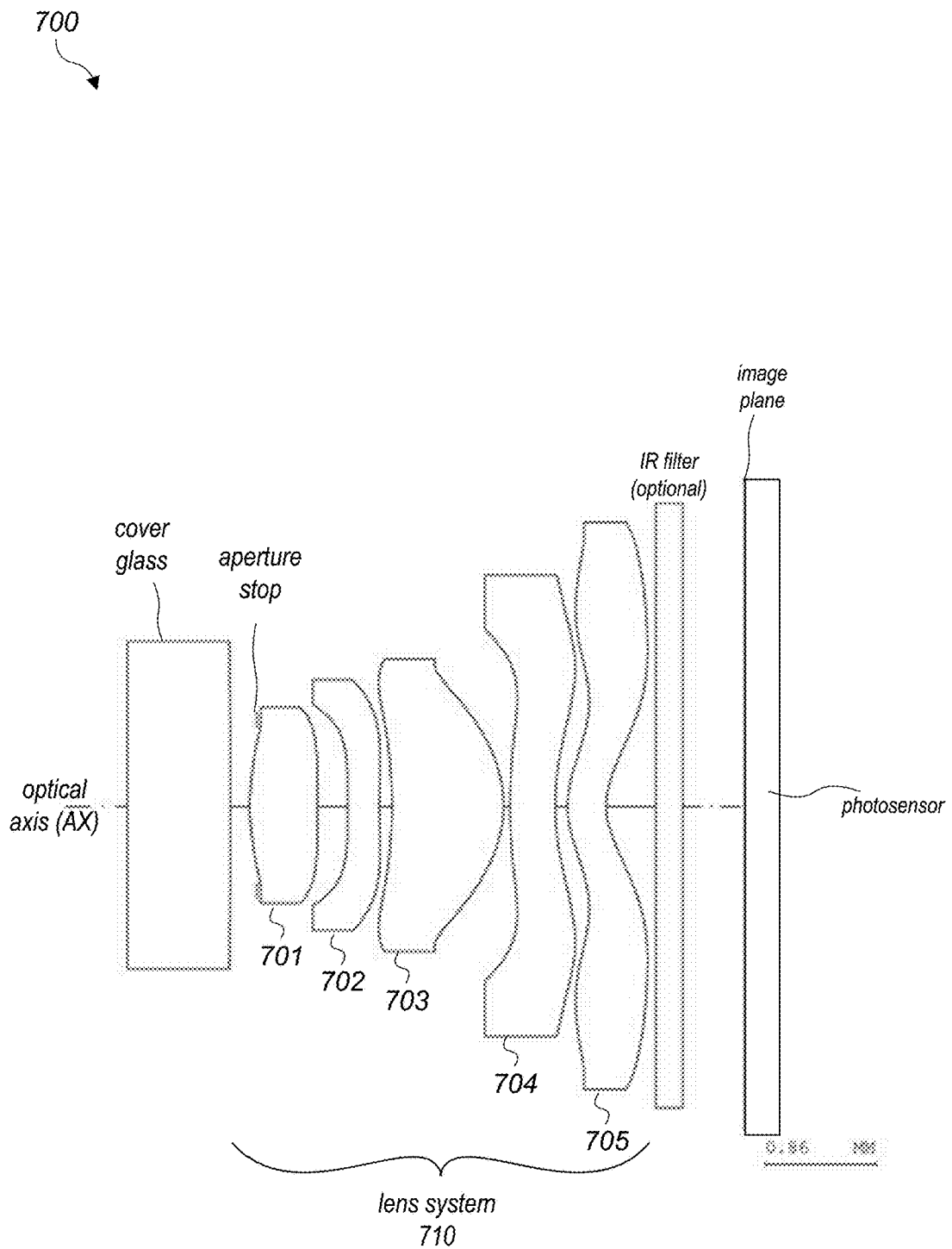
FIG. 7A is a cross-sectional illustration of a first embodiment of a lens system that includes five lens elements.
Figure 13A:
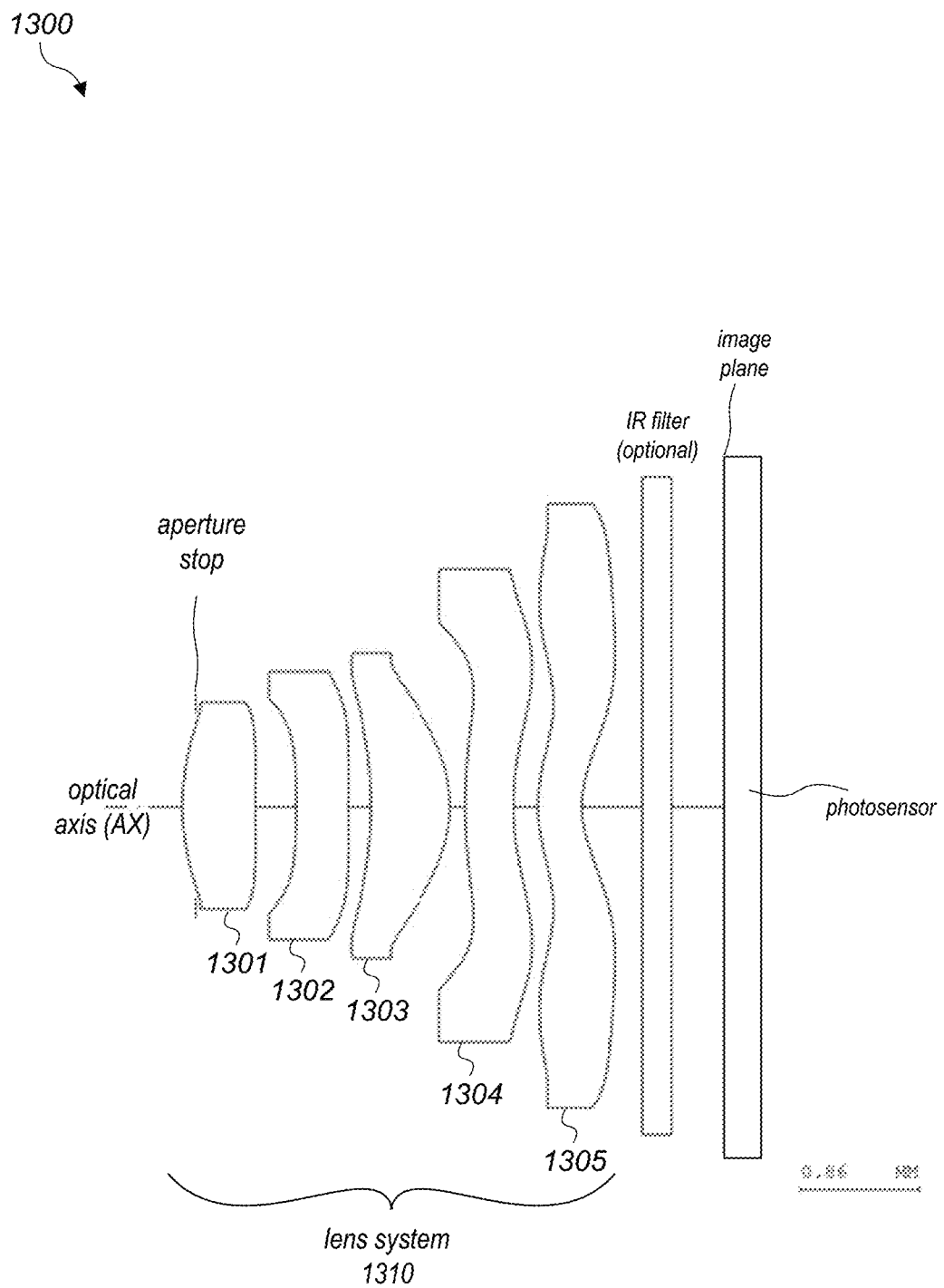
FIG. 13A is a cross-sectional illustration of a seventh embodiment of a lens system that includes five lens elements.

In some embodiments, a cover glass may be located on the object side of the lens system 110 in the camera 100, for example as shown in FIG. 7A. In some embodiments, the cover glass may have a small amount of refractive power. The cover glass may, for example, be composed of a glass material. However, other materials may be used. FIG. 13A shows an example embodiment that does not include a cover glass.

In some embodiments, the lens system 110 is a fixed-focus lens. However, in some embodiments, the camera 100 may include an optical actuator component, for example an optical microelectromechanical system (MEMS), located in front of (i.e., on the object side of) the lens system 110 that provides autofocus (AF) functionality for the camera 100. In some embodiments, the optical actuator may include, but is not limited to, a substrate (e.g., a clear glass or plastic substrate), a flexible optical element (e.g., a flexible lens), and an actuator component that is configured to change the shape of the flexible optical element to provide adaptive optical functionality for the camera without physically moving the camera lens 110. The optical functionality provided by the optical actuator may include autofocus (AF) functionality. In some embodiments, the optical actuator may provide other optical functionality for the camera 100, for example tilt and/or optical image stabilization (OIS) functionality. The optical actuator may also be referred to as an SSAF (Solid-State Auto-Focus) component or module. In some embodiments, the adaptive optical functionality for the camera 100 is provided by the optical actuator changing the shape of the flexible optical element to affect light rays passing from the object field through the flexible optical element to the camera lens, rather than by physically moving the camera lens 110.

Further note that the camera 100 may also include other components than those illustrated and described herein.

In the camera 100, the lens system 110 forms an image at an image plane (IP) at or near the surface of the photosensor 120. The image size for a distant object is directly proportional to the effective focal length f of a lens system 110. The total track length (TTL) of the lens system is the distance on the optical axis (AX) between the front vertex at the object side surface of the first (object side) lens element 101 and the image plane. The ratio of total track length to focal length (TTL/f) is referred to as the telephoto ratio. To be classified as a telephoto lens system, TTL/f is less than or equal to 1. For a non-telephoto lens system, the telephoto ratio is greater than 1.

In at least some embodiments, the lens system 110 may be configured such that the effective focal length f of the lens system is less than 3 mm, and the F-number is 2.4 or less. The lens system 110 may be configured to satisfy specified optical, imaging, and/or packaging constraints for particular camera system applications. Note that the F-number, also referred to as the focal ratio or f/#, is defined by f/D, where D is the diameter of the entrance pupil, i.e. the effective aperture. As an example, in the embodiment illustrated in FIG. 7A, at f=@2.4 mm, an F-number of 2.0 is achieved with an effective aperture of @1.2 mm. The example embodiments may be configured with a full field of view (FOV) of 82 degrees or more. For example, in the embodiment illustrated in FIG. 7A, FOV=95 degrees. In some embodiments, a photosensor 120 with a semi-diagonal image height within a range of 2.0 to 2.7 mm may be used, and the lens system may have a total track length (TTL) of 4 mm or less.

However, note that the focal length f, F-number, TTL, photosensor size, and/or other lens system and camera parameters may vary in different embodiments, and may be scaled or adjusted to meet various specifications of optical, imaging, and/or packaging constraints for other camera system applications. Constraints for a camera system that may be specified as requirements for particular camera system applications and/or that may be varied for different camera system applications include but are not limited to the focal length f, effective aperture, TTL, aperture stop location, F-number, field of view (FOV), telephoto ratio, photosensor size, imaging performance requirements, and packaging volume or size constraints.

In some embodiments, the lens system 110 may be adjustable. For example, in some embodiments, a lens system 110 as described herein may be equipped with an adjustable iris (entrance pupil) or aperture stop 130. Using an adjustable aperture stop, the F-number (focal ratio, or f/#) may be dynamically varied within a range. In some embodiments, the lens system may be used at faster focal ratios by adjusting the aperture stop at the same FOV, possibly with degraded imaging quality performance, or with reasonably good performance at a smaller FOV.

Lens System Parameters and Relationships

As previously noted, the lens system 110 is a front-aperture lens system with a wide FOV (>=82 degrees) and a TTL of 4 mm or less, with a semi-diagonal image height within a range of 2.0 to 2.7 mm. Designing a wide FOV lens system using a front aperture while maintaining good image quality is challenging. Front aperture lens systems are more compact than mid-aperture lens systems, but generally provide a modest FOV that is less than 82 degrees because a FOV region of >=82 degrees is an extreme region for achieving good image quality in lens systems with a front-aperture configuration. With such a wide FOV, optical aberrations that deteriorate the image quality, for example field-curvature, lateral chromatic aberration and distortion, become extremely difficult to correct without the introduction of stop symmetry. Mid-aperture configurations are thus typically used to provide lens systems with a wide FOV. However, mid-aperture lens systems are longer than front-aperture lens systems, and thus may not be suitable for applications where z-axis space is limited such as the front-facing cameras of thin mobile multipurpose devices such as smartphones.

Thus, in embodiments of a lens system 110 as illustrated in FIG. 1, lens system parameters and relationships including but not limited to power distribution, lens shape, thickness, geometry, position, materials, spacing, and the surface shapes of certain lens elements may be selected at least in part to reduce, compensate, or correct for optical aberrations and lens artifacts and effects across the field of view of a wide FOV front aperture lens system including one or more of, but not limited to, field-curvature, lateral chromatic aberration, and distortion.

The design parameters and relationships of the aspheric lens pair comprising the fourth and fifth lens elements (lenses 104 and 105) are of primary importance in correcting for optical aberrations and lens artifacts and effects across the field of view of the wide FOV front aperture lens system 110. FIGS. 2 through 6 illustrate several parameters and relationships for the fourth and fifth lens element of a lens system 110 as illustrated in FIG. 1. However, to correct the optical aberrations and achieve good image quality, the entire lens stack needs to be considered together. Thus, relationships for the first through third lens elements (lenses 101 through 103) are defined as well as relationships for lenses four and five.

Figure 2:
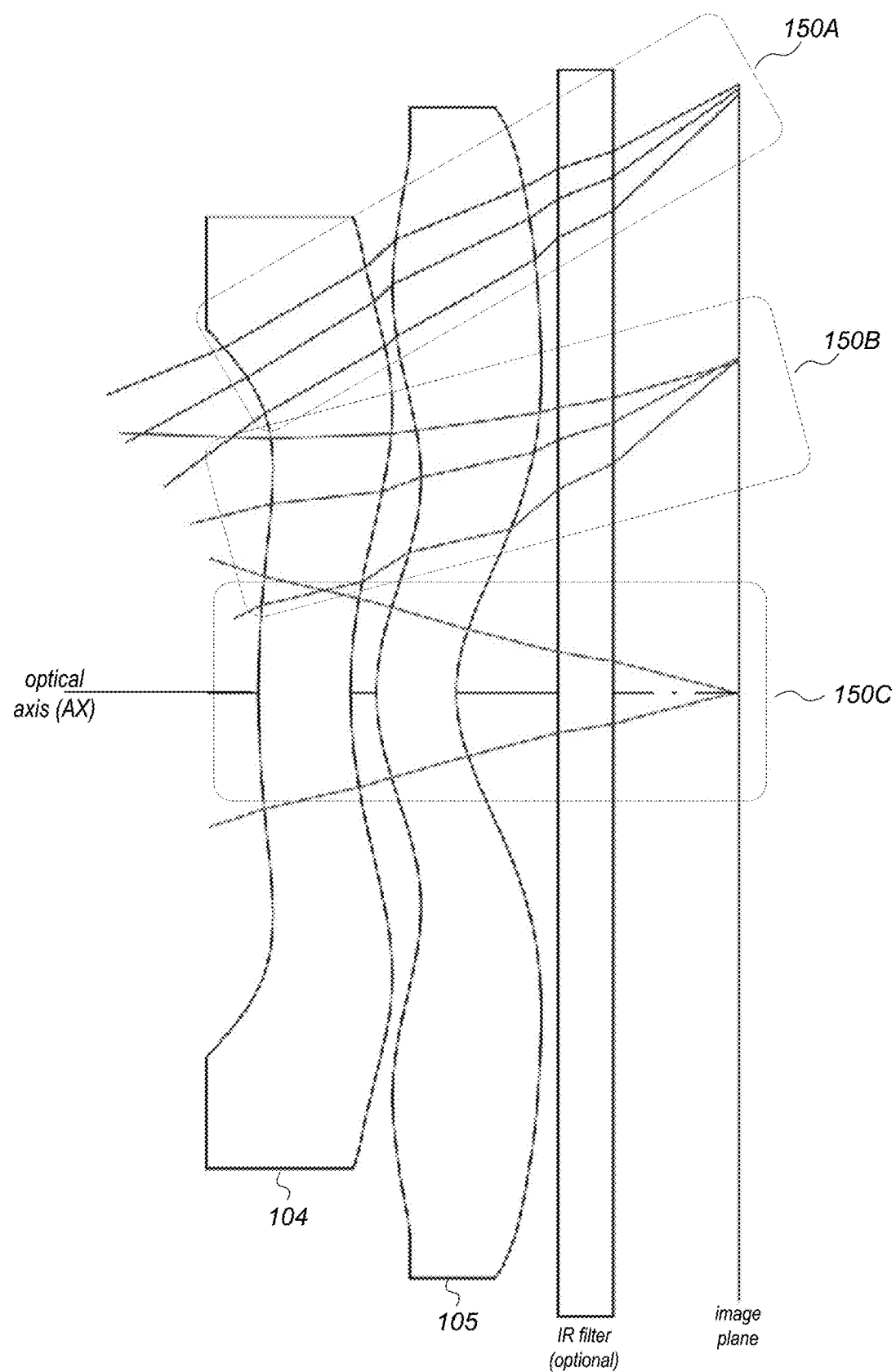
FIG. 2 illustrates optical characteristics of the fourth and fifth lens elements of a lens system as illustrated in FIG. 1, according to some embodiments.

FIG. 2 illustrates optical characteristics of the fourth and fifth lens elements of a lens system as illustrated in FIG. 1, according to some embodiments. Lenses 104 and 105 are aspheric lenses. In some embodiments, lens element 104 may be formed of a material with a relatively low Abbe number ($15<V_d<30$), and lens 105 may be formed of a material with a relatively high Abbe number ($45<V_d<70$).

In the high-FOV (peripheral) region (region 150A), field curvature aberration dominates. A corresponding portion of lens element 104 diverges light; a substantial change from light diverging to converging happens at lens element 105. Thus, lens element 105 is paired with lens element 104 to balance the field curvature at high FOV.

In the mid-FOV region (region 150B), coma balances with field curvature and astigmatism. In this region, both lens element 104 and lens element 105 effectively diverge the ray bundle.

In the central region (region 150C), the optical power of lens element 105 is modest. Spherical aberration dominates the central region, and is mainly corrected by lenses 101 through 104. Lens element 105 may only provide small adjustments for aberration.

Figure 3A:
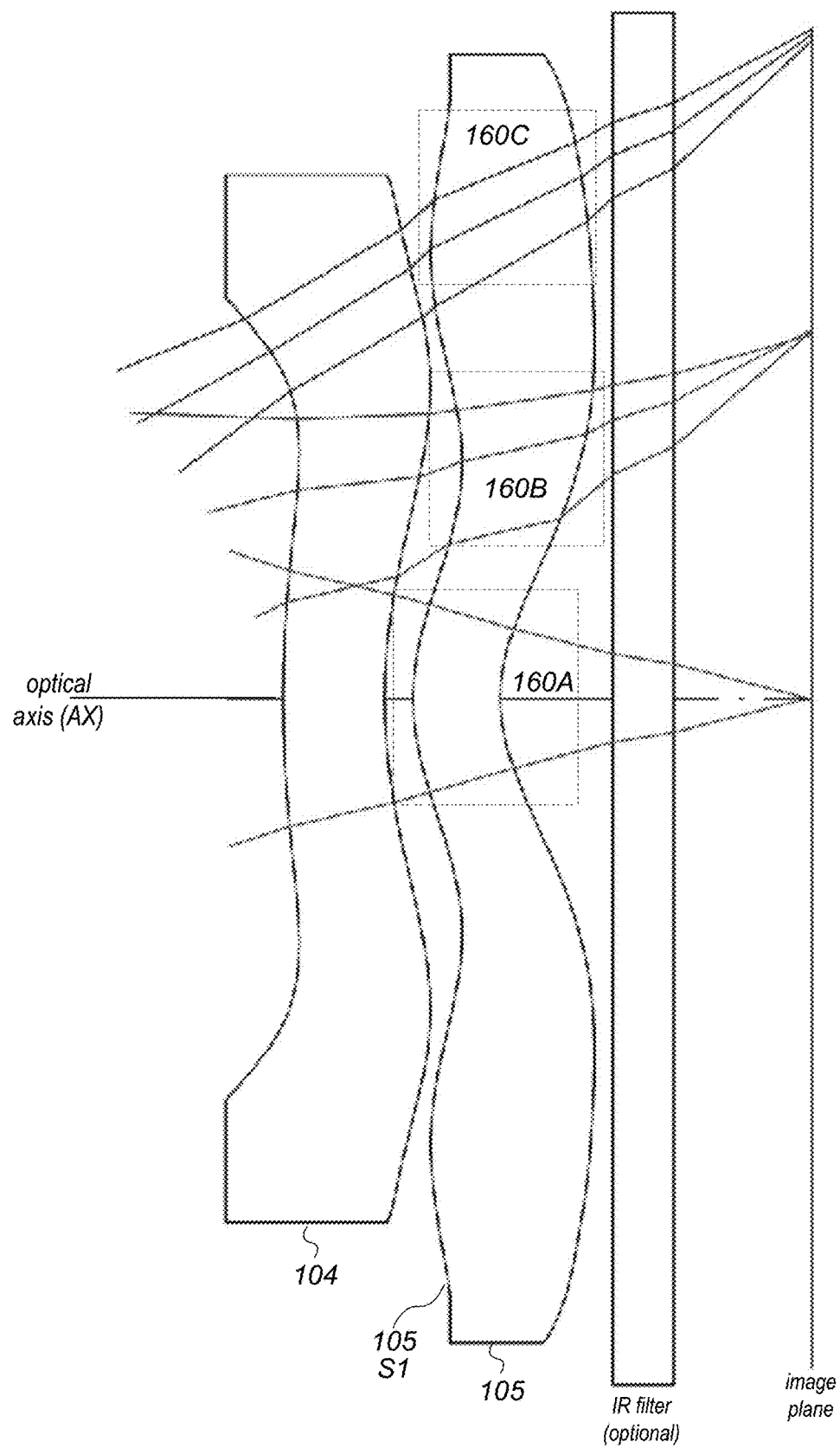
FIGS. 3A and 3B illustrate local radius/curvature of a first surface of the fifth lens element of a lens system as illustrated in FIG. 1, according to some embodiments.
Figure 3B:
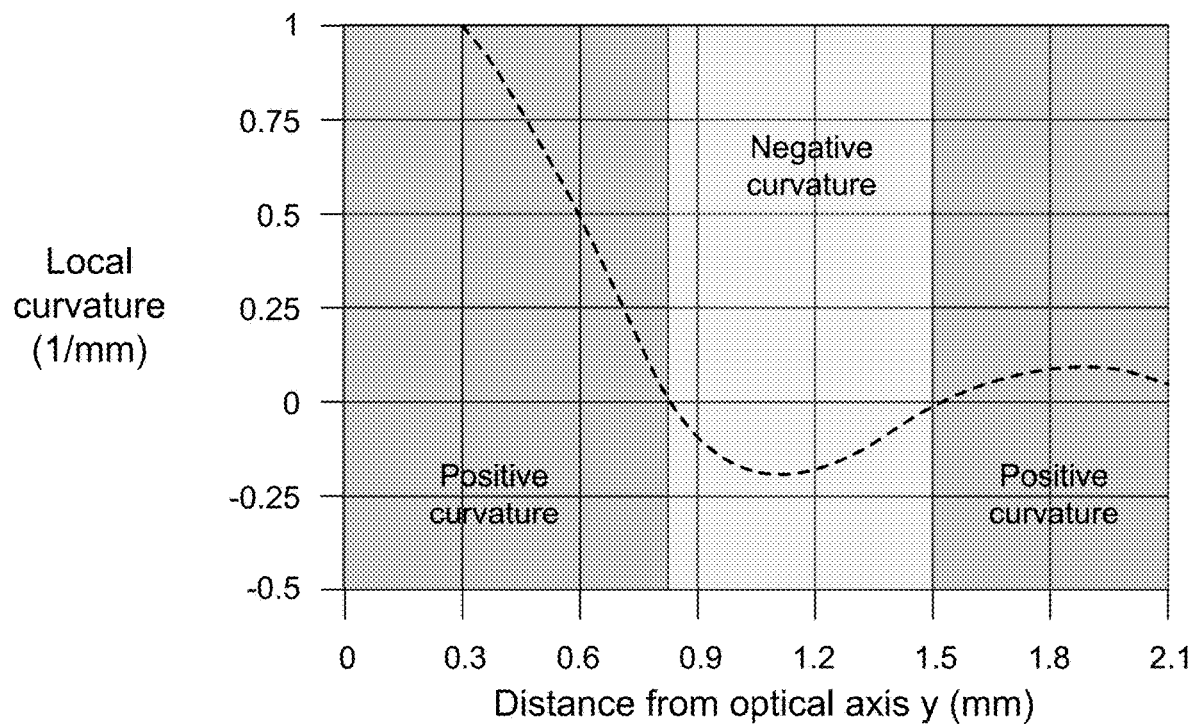

FIGS. 3A and 3B illustrate local radius/curvature of a first surface of the fifth lens element of a lens system as illustrated in FIG. 1, according to some embodiments. The local radius/curvature formula is given by:

$$R = \frac{\left(1 + \frac{d^2z}{dy^2}\right)^{1.5}}{\frac{dz}{dy}}$$

where z is aspheric sag. FIG. 3A shows lens element 105 with a first (object side) surface (S1). Region 160A is a central region of lens element 105 that has a positive radius of curvature, region 160B is a paraxial region of lens element 105 that has a negative radius of curvature, and region 160C is a peripheral region of lens element 105 that has a positive radius of curvature. FIG. 3B is a graph of the change in sign (from positive to negative to positive) of local curvature for S1 from the center (optical axis) of the lens element 105 to the peripheral region/edge of the lens. Referring to FIG. 3B, in embodiments of the lens system 110, the local curvature of lens 105, S1 crosses zero at least twice from the lens center to the lens edge. Thus, embodiments of the lens system 110 may satisfy the relationship:

L5, S1 crosses zero at least twice from the lens center to the lens edge.

Figure 4A:
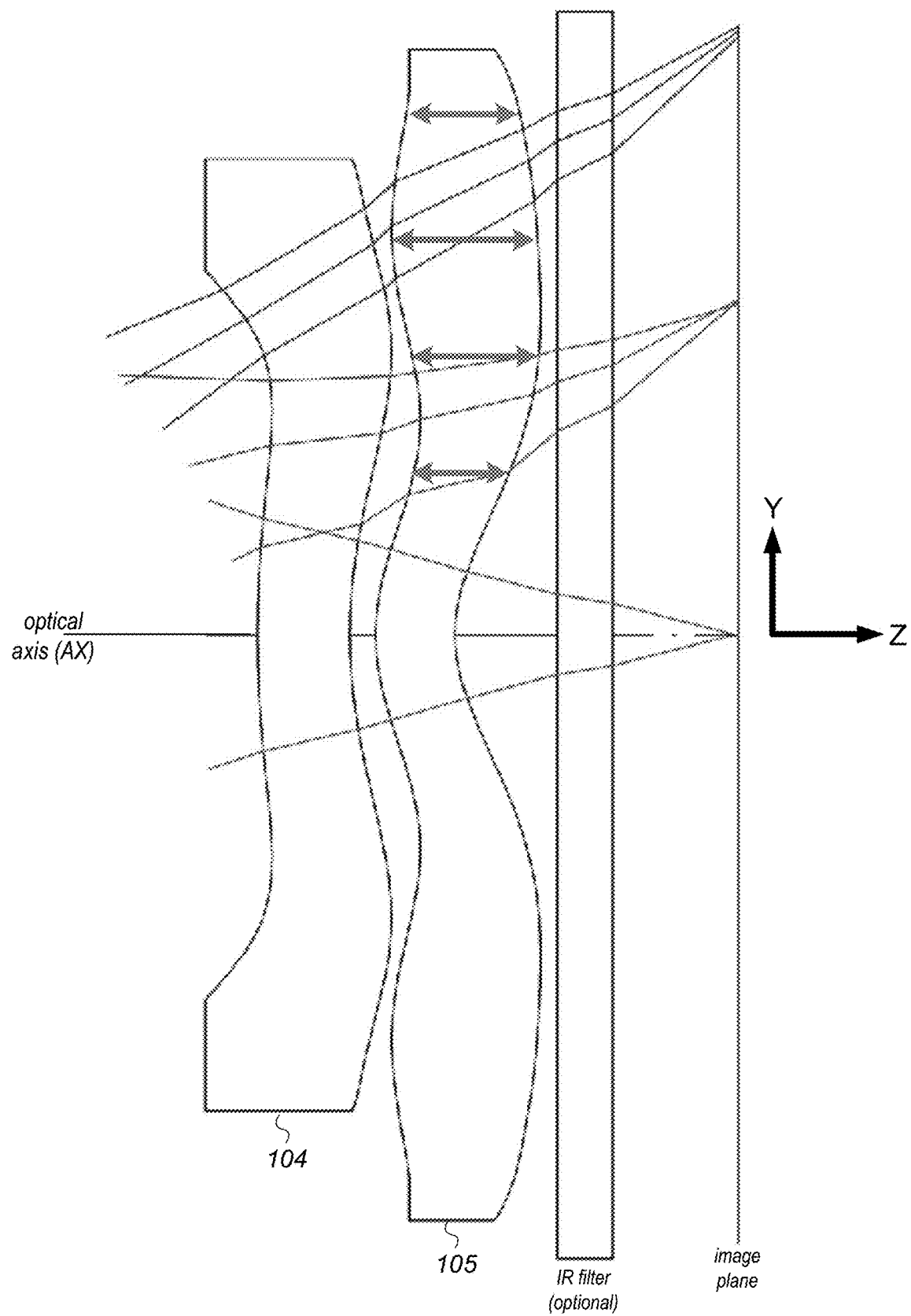
FIGS. 4A and 4B illustrate local thickness delta of the fifth lens element of a lens system as illustrated in FIG. 1, according to some embodiments.
Figure 4B:
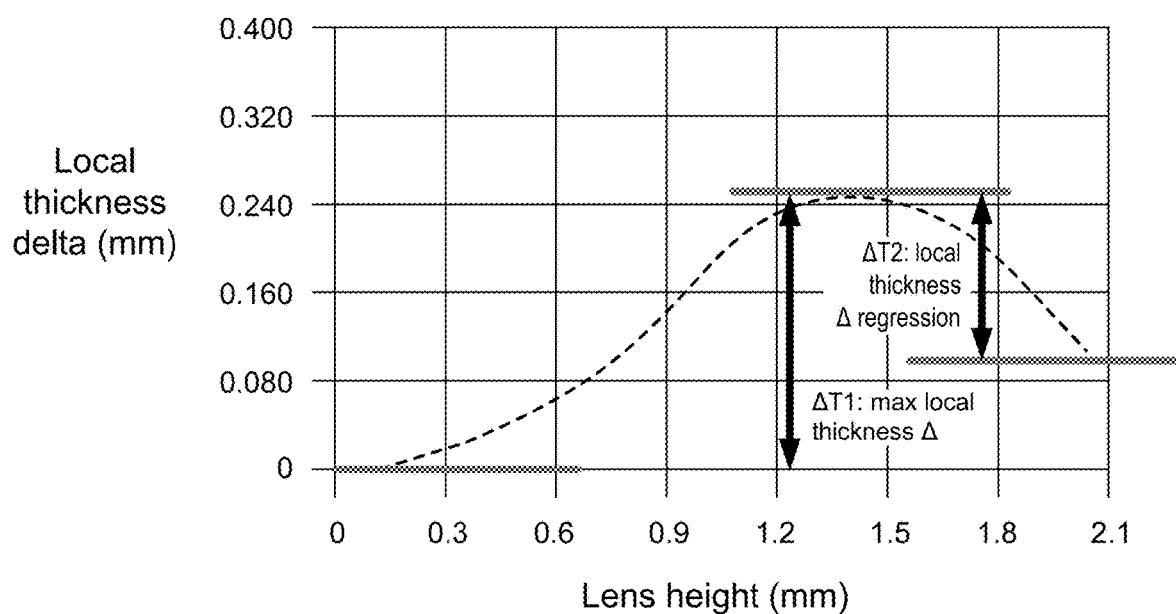

FIGS. 4A and 4B illustrate local thickness delta of the fifth lens element (L5) of a lens system as illustrated in FIG. 1, according to some embodiments. Referring to FIG. 4A, the gray arrows indicate local thickness at example distances on the Y axis from the optical (Z) axis for lens element 105. Referring to FIG. 4B, "0" is at the center of the lens. The Y axis indicates change (delta) in lens thickness progressing to the edge of the lens. Local thickness delta is defined as:

$\Delta LT(y)$=lens thickness @ $y$-center thickness.

$\Delta T1$ is the maximum local thickness delta. $\Delta T2$ is local thickness delta regression. Embodiments of L5 in the lens system 110 may satisfy the relationship:

$\Delta T2/\Delta T1>0.3$, where $\Delta T1$ is max local thickness delta along the lens, and $\Delta T2$ is max regression in local thickness delta within the lens section defined in the range from the point where max local thickness delta is reached to the max clear aperture of the lens.

Figure 5:
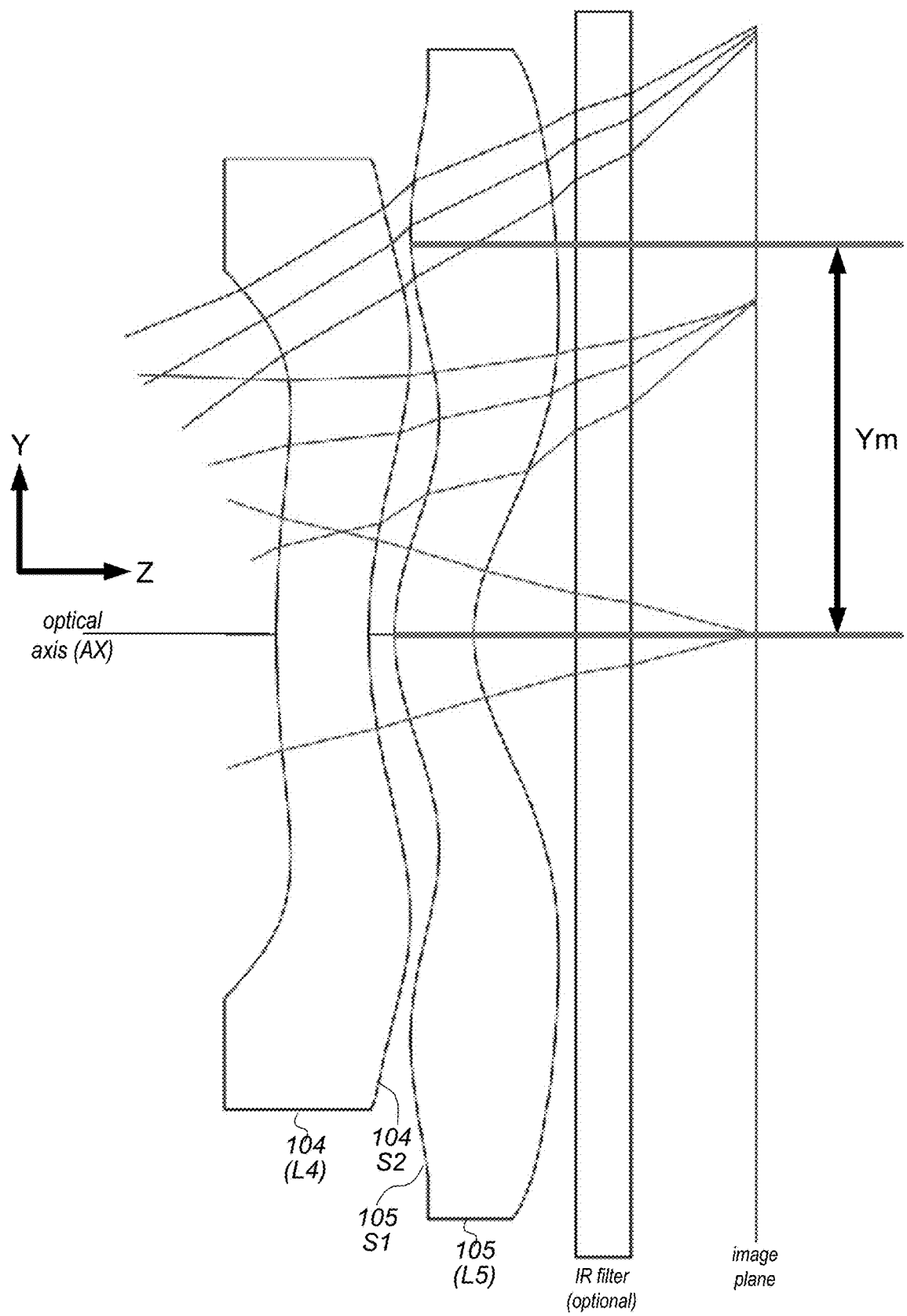
FIGS. 5 and 6 illustrate relationships of the fourth and fifth lens elements of a lens system as illustrated in FIG. 1, according to some embodiments.
Figure 6:
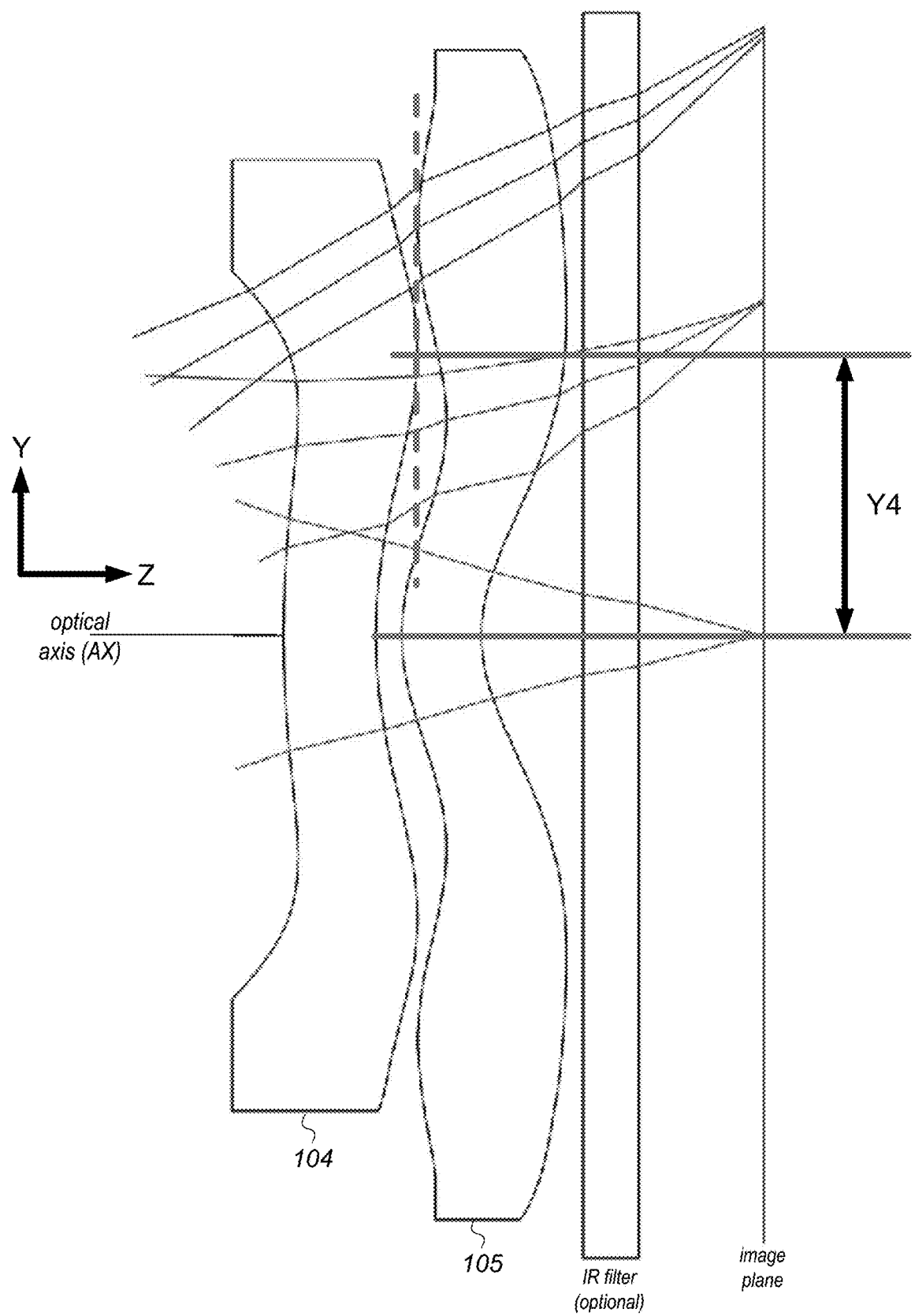

FIGS. 5 and 6 illustrate relationships of the fourth and fifth lens elements of a lens system as illustrated in FIG. 1, according to some embodiments. Referring to FIG. 5, L5 of lens system 110 may satisfy the relationship:

$0.3<Ym/SD<0.7$ where Ym is the height of the point where maximum local thickness occurs, and SD is the semi-diagonal image height. Referring to FIGS. 6, L4 and L5 of lens system 110 may satisfy the relationships:

$0.1<Y4/SD<0.6$ $Y4<Ym$ where Y4 is the height of the point where the aspheric inflection point of L4, S2 occurs.

In embodiments, the lens system 110 may have an F-number of 2.4 or less, an effective focal length f of less than 3 mm, and may provide a wide (>=82 degrees) full field of view (FFOV). The lens system 110 may satisfy the relationship:

$TTL/2SD<0.85$ where TTL is the total track length of the lens system 110, and SD is the semi-diagonal image height.

The lens system 110 may include five lens elements with refractive power and effective focal length f, arranged along an optical axis AX in order from an object side to an image side:

a first lens element L1 (101);
a second lens element L2 (102);
a third lens element L3 (103);
a fourth lens element L4 (104); and
a fifth lens element L5 (105).

In some embodiments, L1 has positive refractive power. In some embodiments, the object side surface of L1 is convex in the paraxial region. In some embodiments, L1 is composed of a material with an Abbe number vd1, where $45<vd1<70$. In some embodiments, L1 satisfies the relationships:

$|fsys/f1|>0.5$ $0.8<|R1+R2|/|R1-R2|<1.5$ where fsys is the effective focal length of the lens system, f1 is effective focal length of L1, and R1 and R2 are radius of curvature of the object side surface and the image side surface of L1, respectively.

In some embodiments, L2 has negative refractive power. In some embodiments, the object side surface of L2 is convex in the paraxial region. In some embodiments, L2 is composed of a material with an Abbe number vd2, where 15<vd2<30. In some embodiments, L2 satisfies the relationship:

$|fsys/f2|<0.5$ where fsys is the effective focal length of the lens system, and f2 is effective focal length of L2.

In some embodiments, L3 has positive refractive power. In some embodiments, the object side surface of L3 is concave in the paraxial region. In some embodiments, the image side surface of L3 is convex in the paraxial region. In some embodiments, L3 satisfies the relationships:

$|fsys/f3|>0.5;|$ $R5+R6|/|R5-R6|<4$ where fsys is the effective focal length of the lens system, f3 s effective focal length of L3, and R5 and R6 are radius of curvature of the object side surface and image side surface of L3, respectively.

In some embodiments, L4 has negative refractive power. In some embodiments, the object side surface of L4 is aspheric and has at least one part being concave along the lens. In some embodiments, the image side surface of L4 is concave in the paraxial region and has at least one part being convex along the lens shape. In some embodiments, L4 is composed of a material with an Abbe number vd4, where 15<vd4<30. In some embodiments, L4 satisfies the relationships:

$-0.8<fsys/f4<-0.2$ $1<(R7+R8)/(R7-R8)<4$ where fsys is the effective focal length of the lens system, f4 is effective focal length of L4, and R7 and R8 are radius of curvature of the object side surface and the image side surface of L4, respectively.

In some embodiments, L5 has refractive power. In some embodiments, the object side surface of L5 is convex in the paraxial region, and the surface form is aspheric. In some embodiments, the image side surface of L5 is concave in the paraxial region, and the surface form is aspheric. In some embodiments, L5 is composed of a material with an Abbe number vd5, where 45<vd5<70. In some embodiments, L5 satisfies the relationships:

$|fsys/f5|<0.55$ $(R9+R10)/(R9-R10)>4$ where fsys is the effective focal length of the lens system, f5 is effective focal length of L5, and R9 and R10 are radius of curvature of the object side surface and the image side surface of L5, respectively.

Example Embodiments

FIGS. 7A, 8A, 9A, 10A, 11A, 12A, 13A, and 14A illustrate several example embodiments of a lens system as illustrated in FIG. 1 that include five refracting lens elements and a front aperture stop. The example embodiments may provide an F-number (focal ratio) of 2.4 or less, field of view (FOV) of 82 degrees or more, focal length (f) of 3.0 mm or less, and a total track length (TTL) of 4 mm or less, with a semi-diagonal image height within a range of 2.0 to 2.7 mm. Note, however, that these examples are not intended to be limiting, and that variations on the various parameters given for the lens systems are possible while still achieving similar results.

Example Lens System 710

FIG. 7A illustrates an example camera 700 with a lens system 710 that includes five refractive lens elements, according to some embodiments. Lens system 710 may have an effective focal length f of @2.4 mm, F-number of 2.0, and field of view (FOV) of 95 degrees. Lens system 710 may include five lens elements with refractive power, arranged along an optical axis AX in order from an object side to an image side:
 a first lens element 701;
 a second lens element 702;
 a third lens element 703;
 a fourth lens element 704; and
 a fifth lens element 705.

Figure 7B:
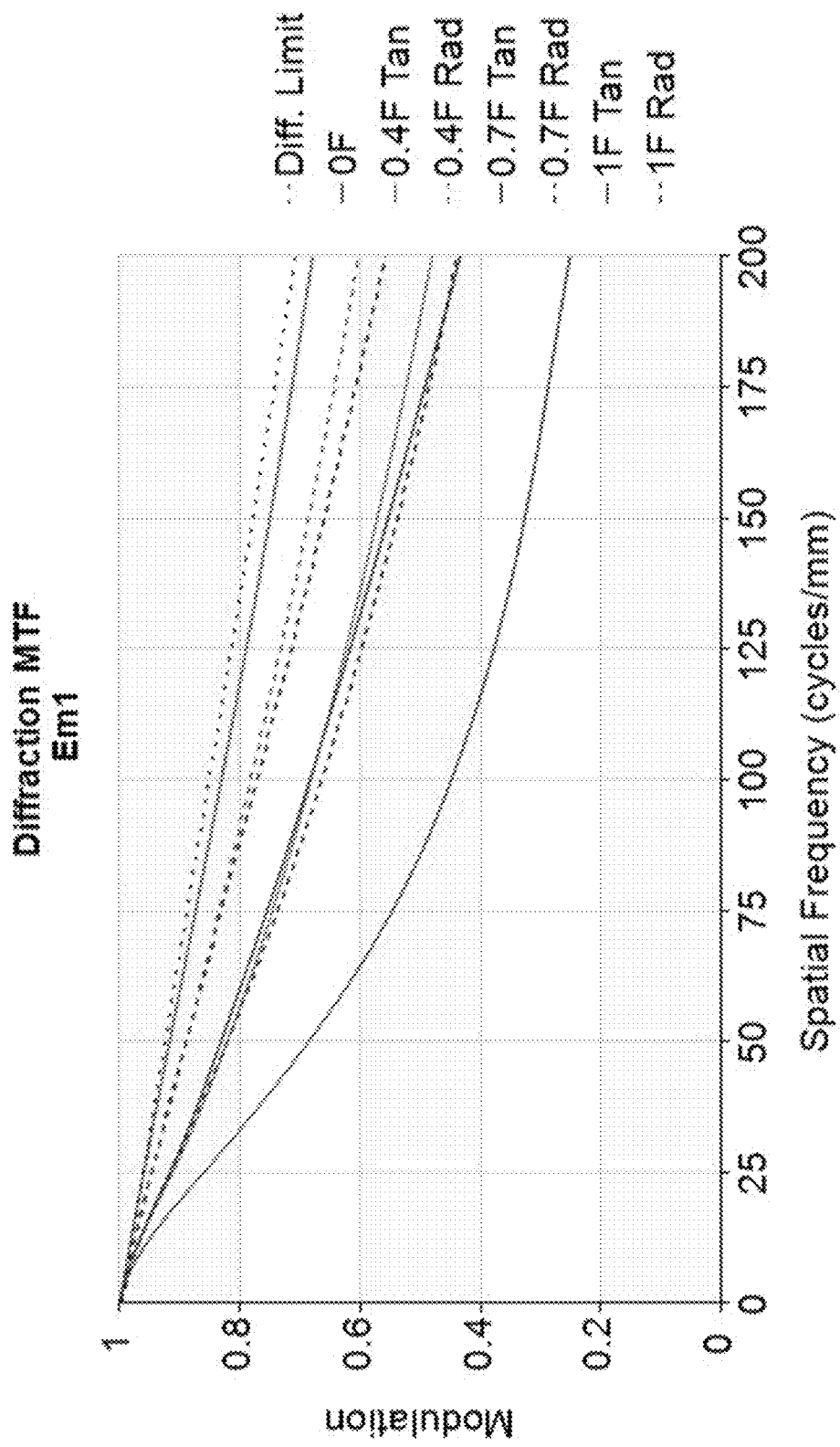
FIG. 7B is a graph illustrating the modulation transfer function (MTF) for a lens system as illustrated in FIG. 7A.

As shown in FIG. 7A, lens system 710 system may include a front aperture stop. The camera 700 may include an IR filter located between lens element 705 and a photosensor. A cover glass may be located on the object side of the lens system 710. FIG. 7B is a graph illustrating the diffraction modulation transfer function (MTF) for a lens system 710 as illustrated in FIG. 7A, according to some embodiments. Tables 1 through 3 provide details for example lens system 710.

Example Lens System 810

Figure 8A:
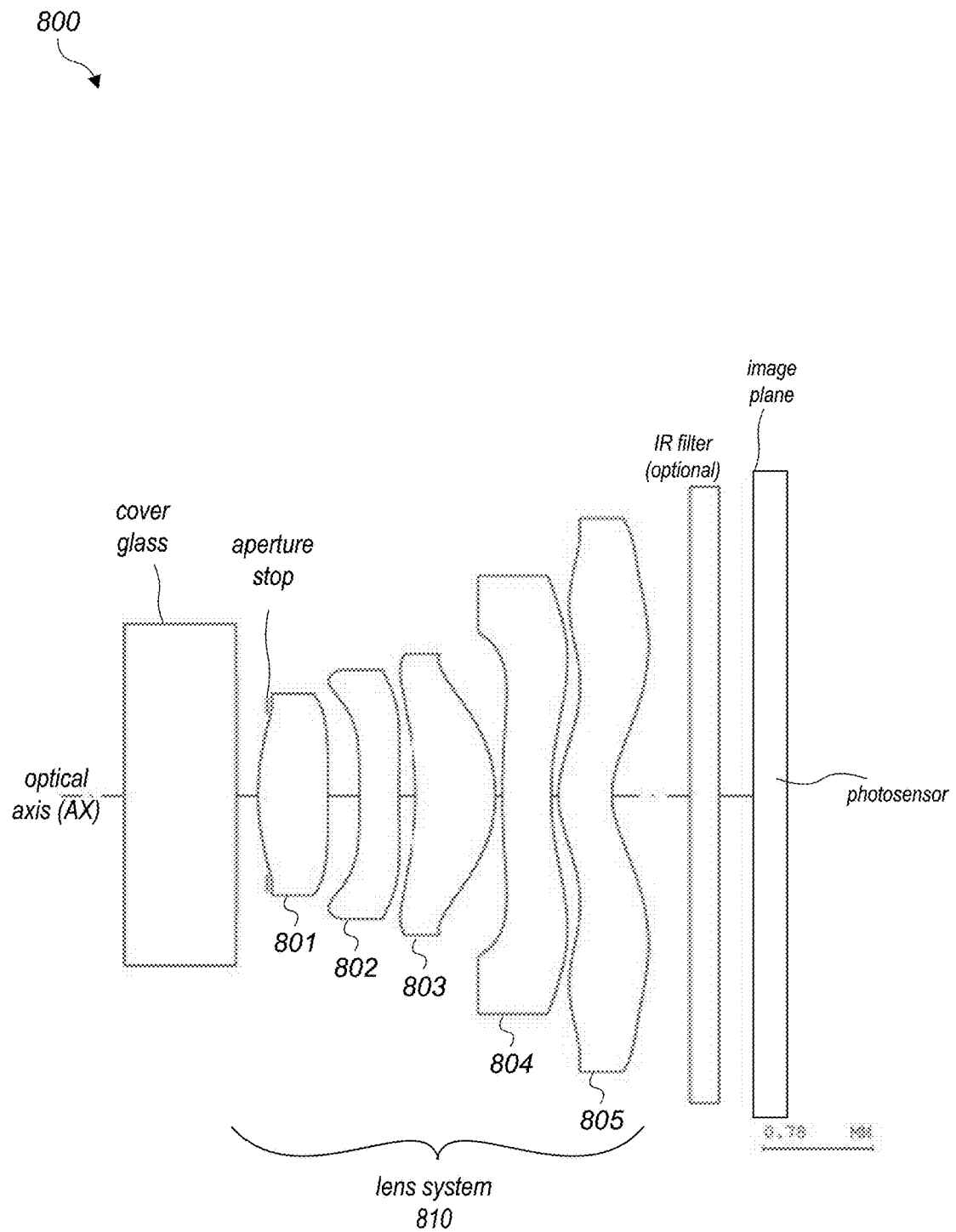
FIG. 8A is a cross-sectional illustration of a second embodiment of a lens system that includes five lens elements.

FIG. 8A illustrates an example camera 800 with a lens system 810 that includes five refractive lens elements, according to some embodiments. Lens system 810 may have an effective focal length f of @2.3 mm, F-number of 2.0, and field of view (FOV) of 90 degrees. Lens system 810 may include five lens elements with refractive power, arranged along an optical axis AX in order from an object side to an image side:
 a first lens element 801;
 a second lens element 802;
 a third lens element 803;
 a fourth lens element 804; and
 a fifth lens element 805.

Figure 8B:
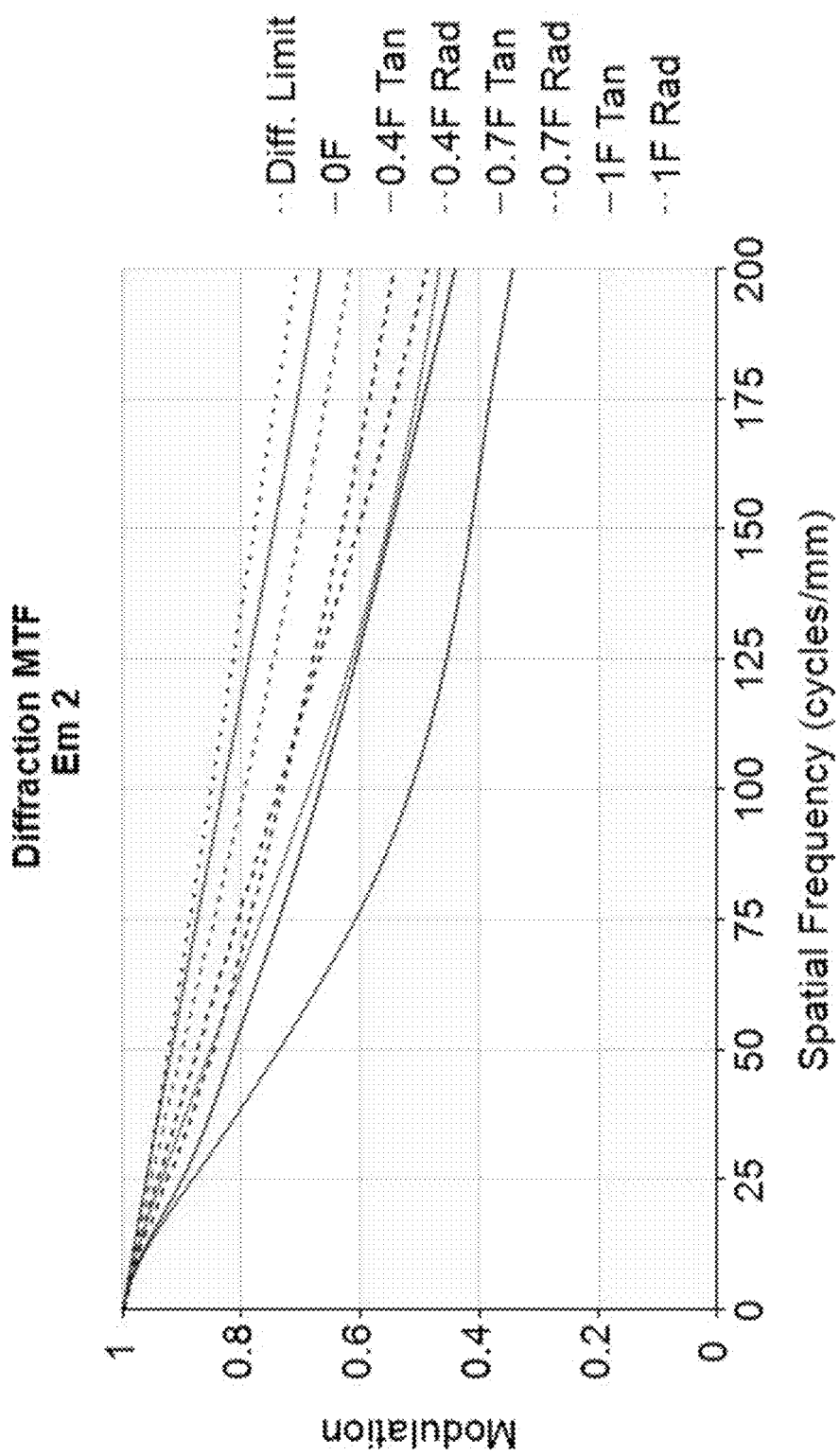
FIG. 8B is a graph illustrating the MTF for a lens system as illustrated in FIG. 9A.

As shown in FIG. 8A, lens system 810 system may include a front aperture stop. The camera 800 may include an IR filter located between lens element 805 and a photosensor. A cover glass may be located on the object side of the lens system 810. FIG. 8B is a graph illustrating the diffraction modulation transfer function (MTF) for a lens system 810 as illustrated in FIG. 8A, according to some embodiments.

Example Lens System 910

Figure 9A:
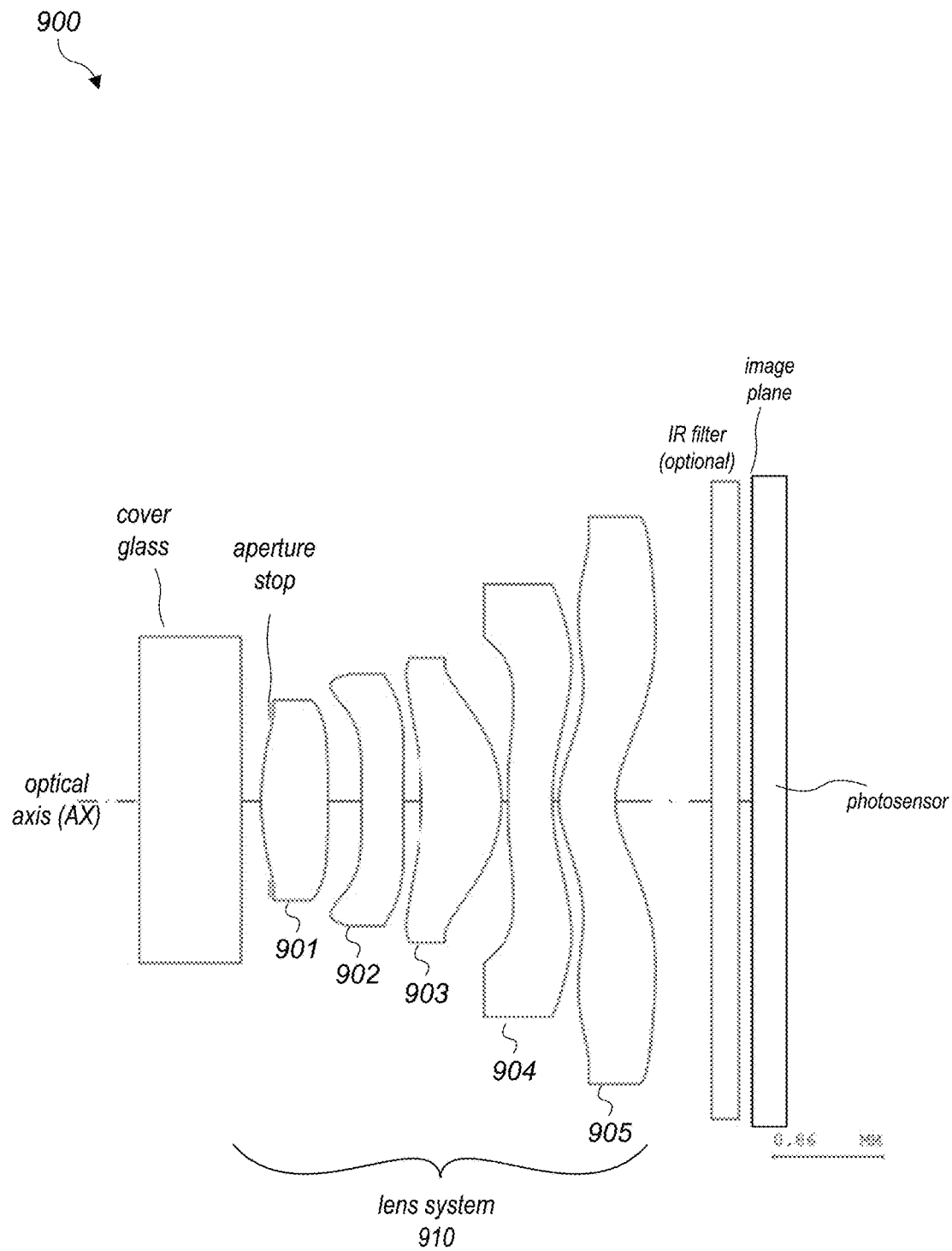
FIG. 9A is a cross-sectional illustration of a third embodiment of a lens system that includes five lens elements.

FIG. 9A illustrates an example camera 900 with a lens system 910 that includes five refractive lens elements, according to some embodiments. Lens system 910 may have an effective focal length f of @2.52 mm, F-number of 2.0, and field of view (FOV) of 90 degrees. Lens system 910 may include five lens elements with refractive power, arranged along an optical axis AX in order from an object side to an image side:
 a first lens element 901;
 a second lens element 902;
 a third lens element 903;

a fourth lens element 904; and a fifth lens element 905.

Figure 9B:
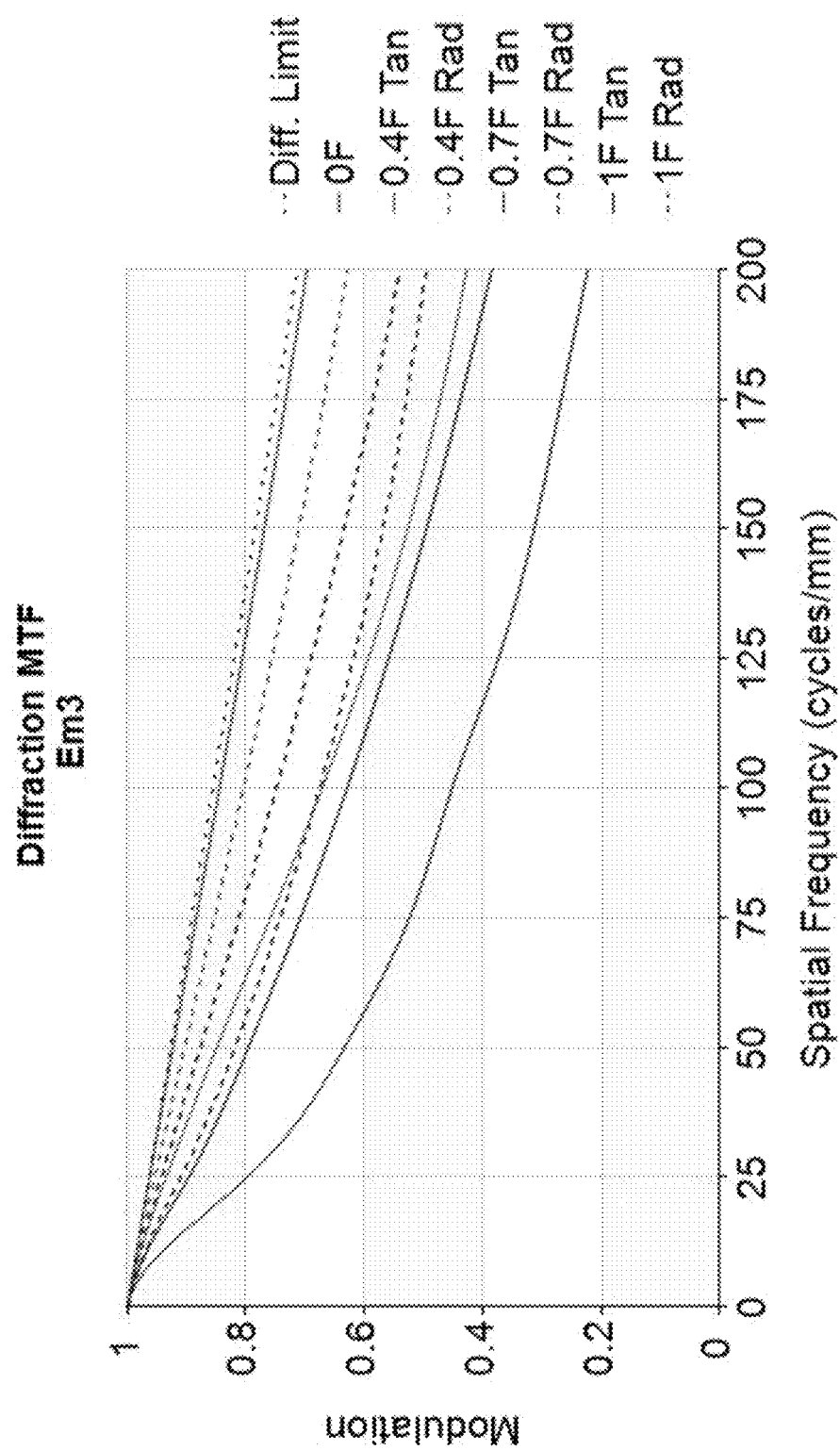
FIG. 9B is a graph illustrating the MTF for a lens system as illustrated in FIG. 3A.

As shown in FIG. 9A, lens system 910 system may include a front aperture stop. The camera 900 may include an IR filter located between lens element 905 and a photosensor. A cover glass may be located on the object side of the lens system 910. FIG. 9B is a graph illustrating the diffraction modulation transfer function (MTF) for a lens system 910 as illustrated in FIG. 9A, according to some embodiments.

Example Lens System 1010

Figure 10A:
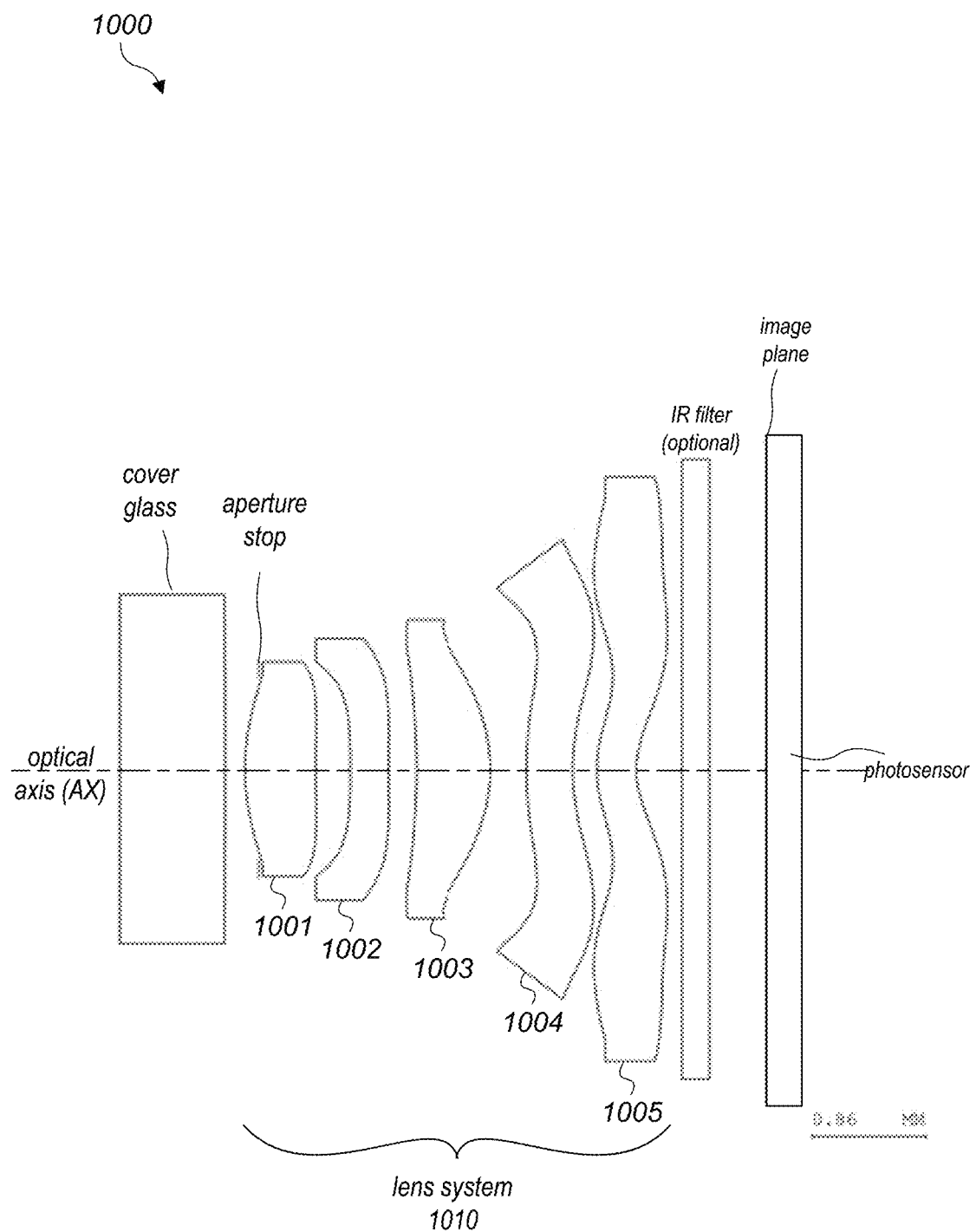
FIG. 10A is a cross-sectional illustration of a fourth embodiment of a lens system that includes five lens elements.

FIG. 10A illustrates an example camera 1000 with a lens system 1010 that includes five refractive lens elements, according to some embodiments. Lens system 1010 may have an effective focal length f of @2.74 mm, F-number of 2.0, and field of view (FOV) of 85 degrees. Lens system 1010 may include five lens elements with refractive power, arranged along an optical axis AX in order from an object side to an image side:

a first lens element 1001;

a second lens element 1002;

a third lens element 1003 a fourth lens element 1004; and a fifth lens element 1005.

Figure 10B:
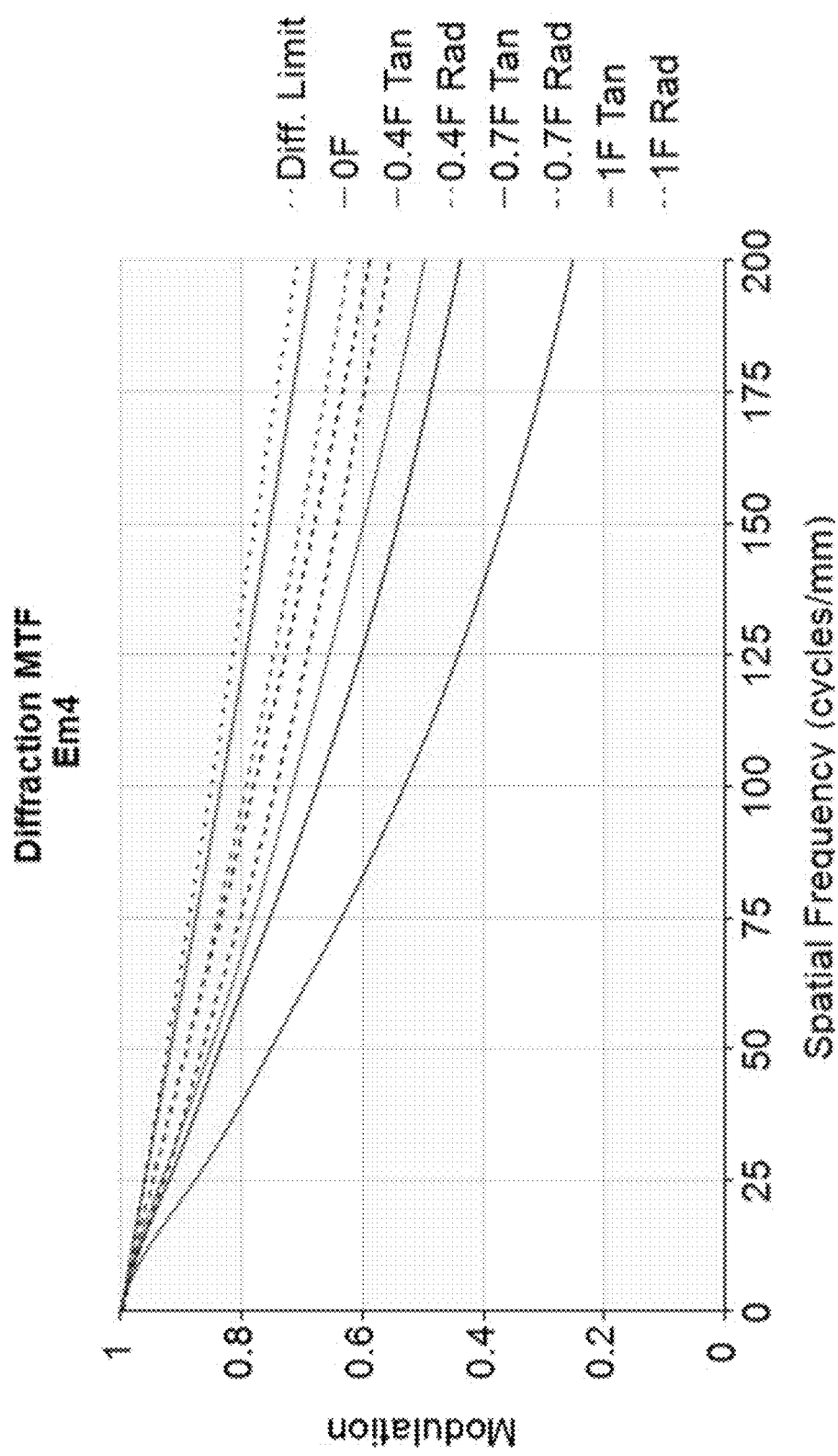
FIG. 10B is a graph illustrating the MTF for a lens system as illustrated in FIG. 10A.

As shown in FIG. 10A, lens system 1010 system may include a front aperture stop. The camera 1000 may include an IR filter located between lens element 1005 and a photosensor. A cover glass may be located on the object side of the lens system 1010. FIG. 10B is a graph illustrating the diffraction modulation transfer function (MTF) for a lens system 1010 as illustrated in FIG. 10A, according to some embodiments.

Example Lens System 1110

Figure 11A:
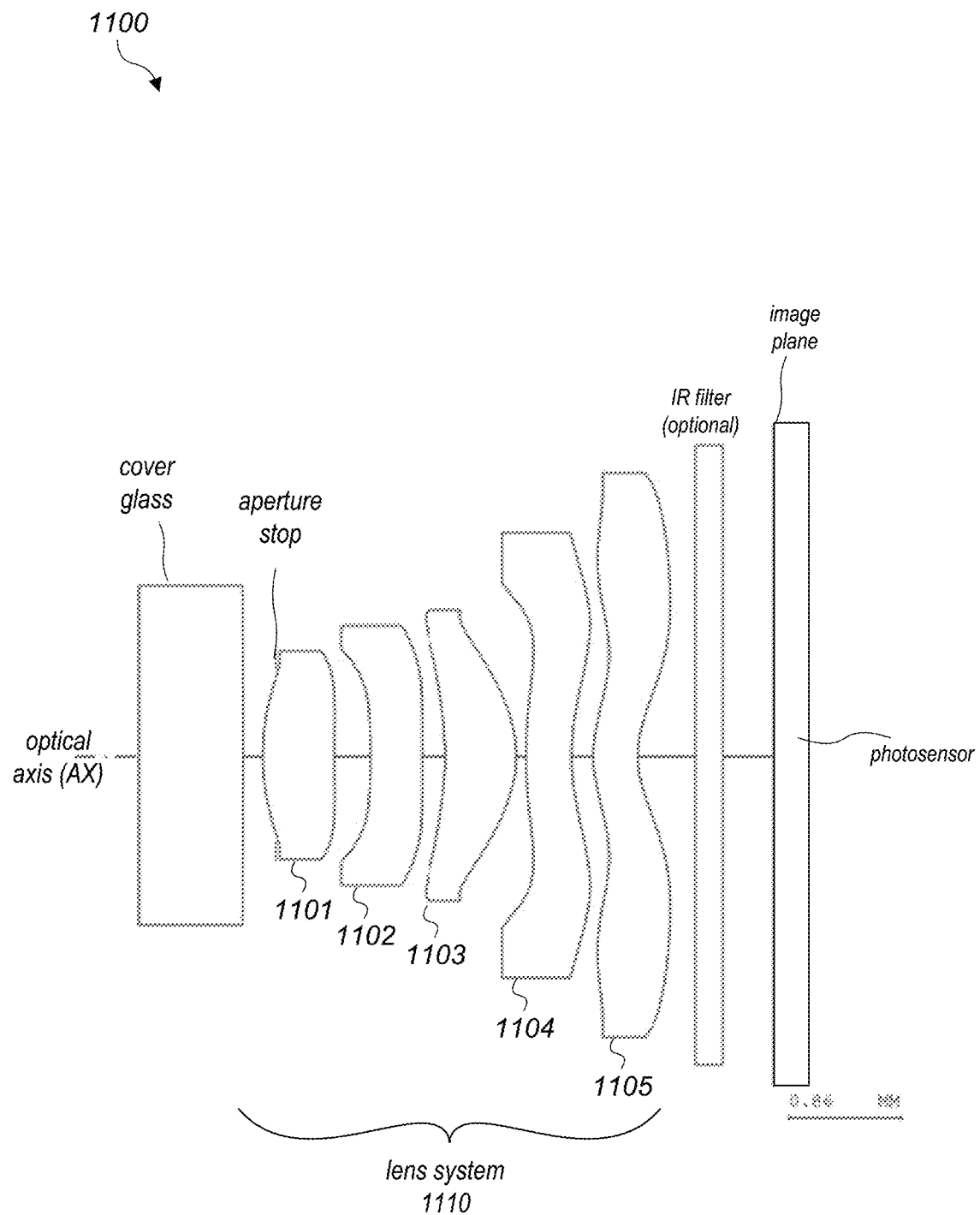
FIG. 11A is a cross-sectional illustration of a fifth embodiment of a lens system that includes five lens elements.

FIG. 11A illustrates an example camera 1100 with a lens system 1110 that includes five refractive lens elements, according to some embodiments. Lens system 1110 may have an effective focal length f of @2.67 mm, F-number of 2.0, and field of view (FOV) of 85 degrees. Lens system 1110 may include five lens elements with refractive power, arranged along an optical axis AX in order from an object side to an image side:

a first lens element 1101;

a second lens element 1102;

a third lens element 1103;

a fourth lens element 1104; and a fifth lens element 1105.

Figure 11B:
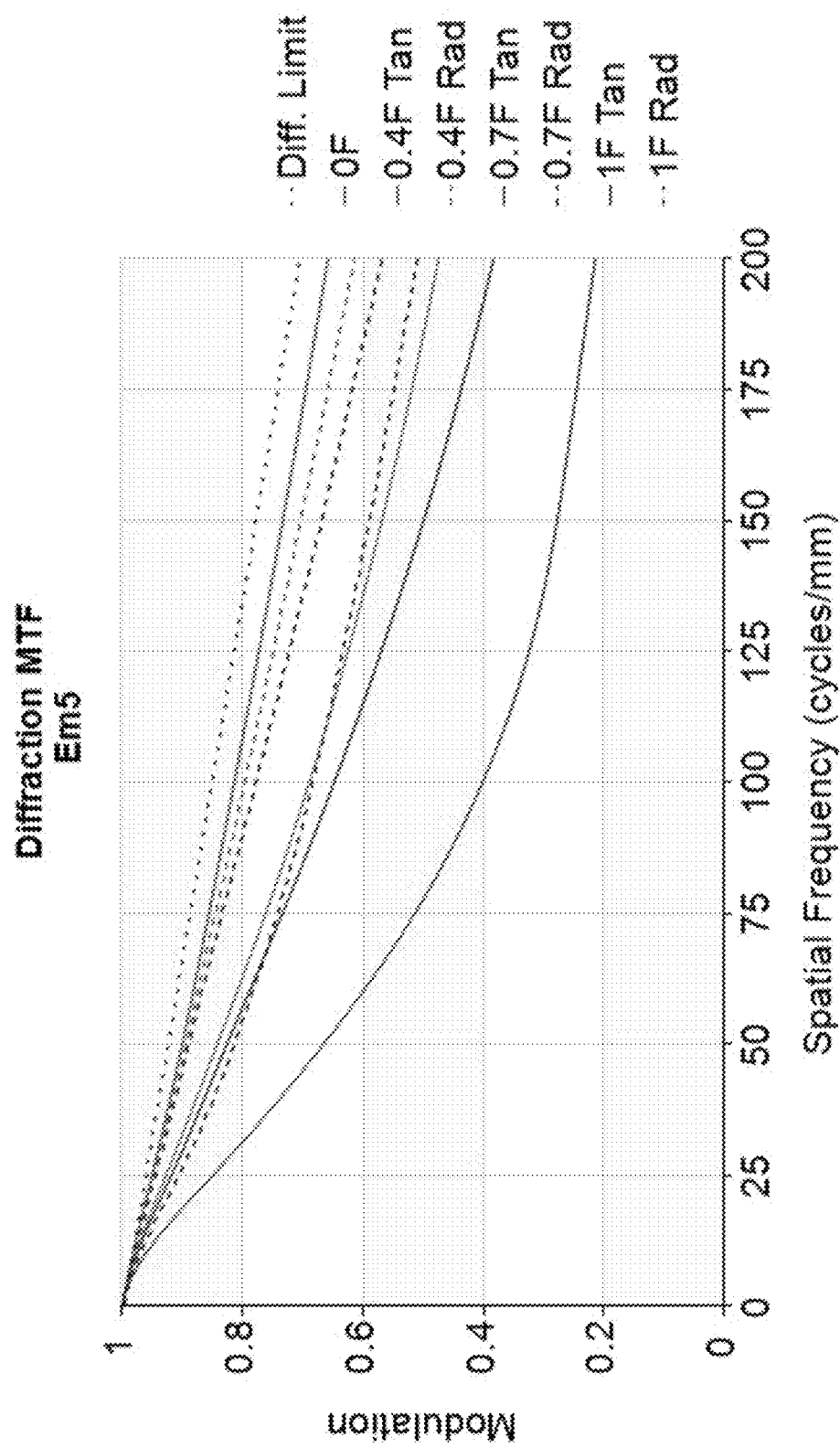
FIG. 11B is a graph illustrating the MTF for a lens system as illustrated in FIG. 11A.

As shown in FIG. 11A, lens system 1110 system may include a front aperture stop. The camera 1100 may include an IR filter located between lens element 1105 and a photosensor. A cover glass may be located on the object side of the lens system 1110. FIG. 11B is a graph illustrating the diffraction modulation transfer function (MTF) for a lens system 1110 as illustrated in FIG. 11A, according to some embodiments.

Example Lens System 1210

Figure 12A:
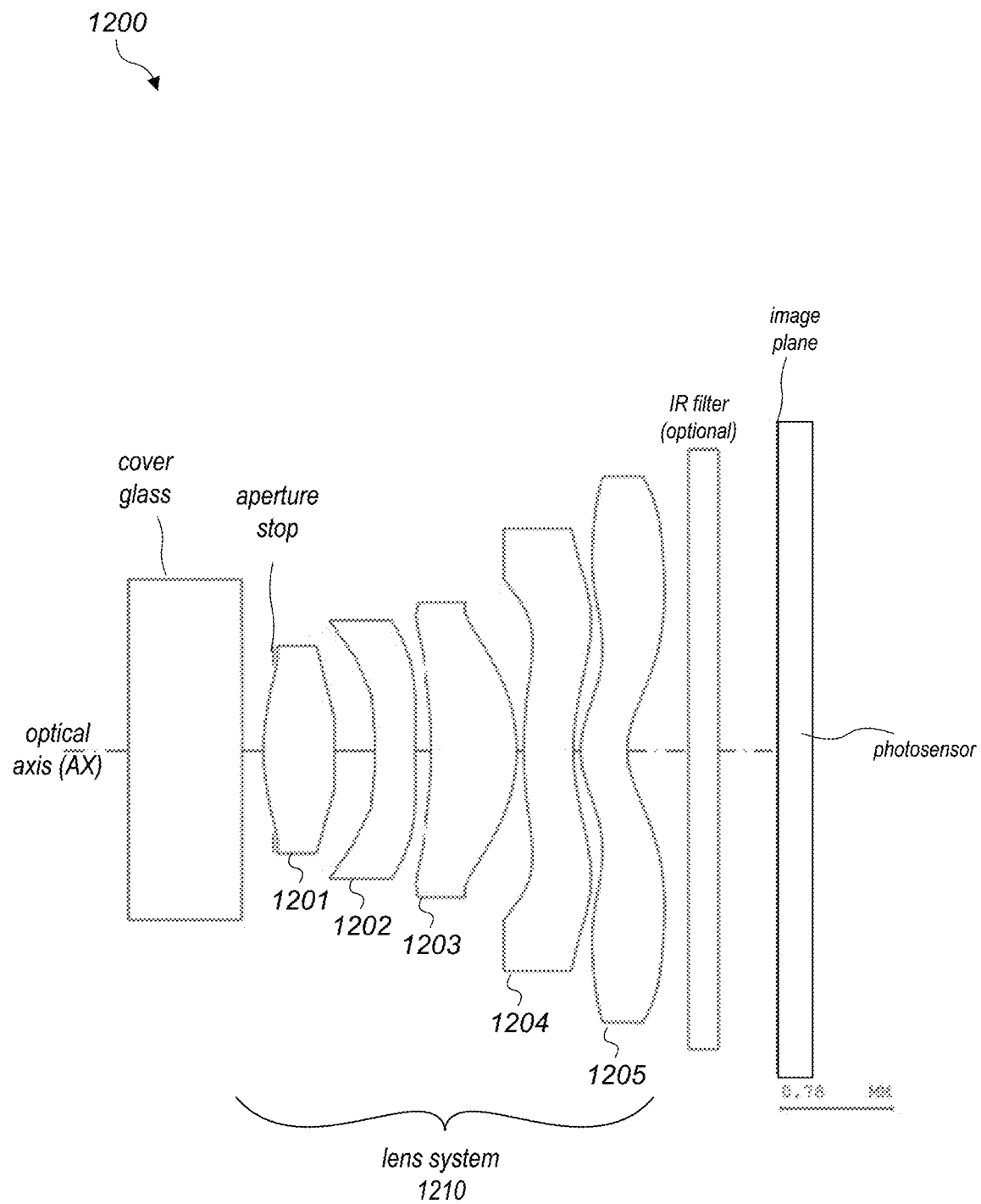
FIG. 12A is a cross-sectional illustration of a sixth embodiment of a lens system that includes five lens elements.

FIG. 12A illustrates an example camera 1200 with a lens system 1210 that includes five refractive lens elements, according to some embodiments. Lens system 1210 may have an effective focal length f of @2.38 mm, F-number of 2.0, and field of view (FOV) of 85 degrees. Lens system 1210 may include five lens elements with refractive power, arranged along an optical axis AX in order from an object side to an image side:

a first lens element 1201;

a second lens element 1202;

a third lens element 1203;

a fourth lens element 1204; and a fifth lens element 1205.

Figure 12B:
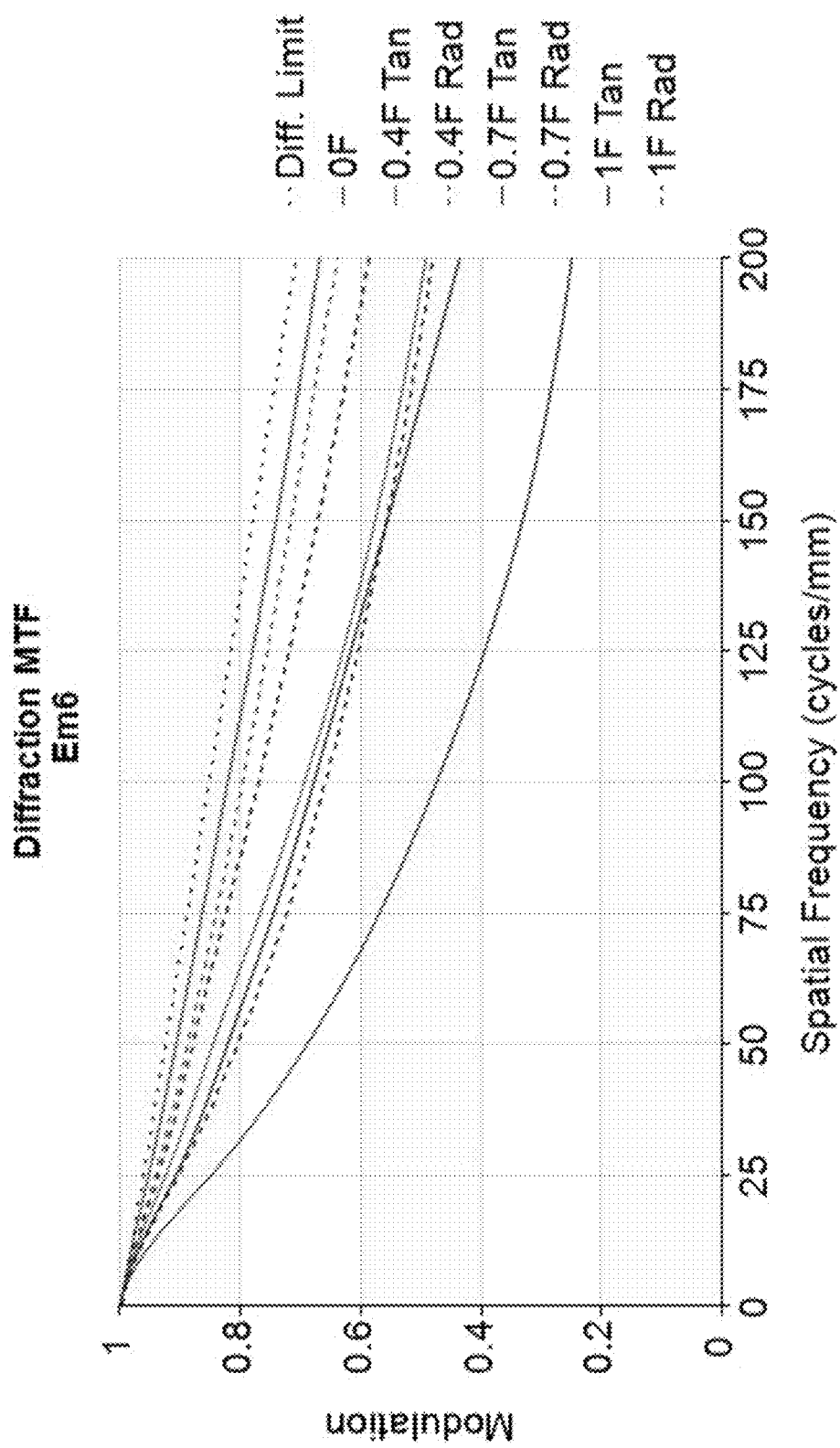
FIG. 12B is a graph illustrating the MTF for a lens system as illustrated in FIG. 12A.

As shown in FIG. 12A, lens system 1210 system may include a front aperture stop. The camera 1200 may include an IR filter located between lens element 1205 and a photosensor. A cover glass may be located on the object side of the lens system 1210. FIG. 12B is a graph illustrating the diffraction modulation transfer function (MTF) for a lens system 1210 as illustrated in FIG. 12A, according to some embodiments.

Example Lens System 1310

FIG. 13A illustrates an example camera 1300 with a lens system 1310 that includes five refractive lens elements, according to some embodiments. Lens system 1310 may have an effective focal length f of @2.69 mm, F-number of 2.2, and field of view (FOV) of 85 degrees. Lens system 1310 may include five lens elements with refractive power, arranged along an optical axis AX in order from an object side to an image side:

a first lens element 1301;

a second lens element 1302;

a third lens element 1303;

a fourth lens element 1304; and a fifth lens element 1305.

Figure 13B:
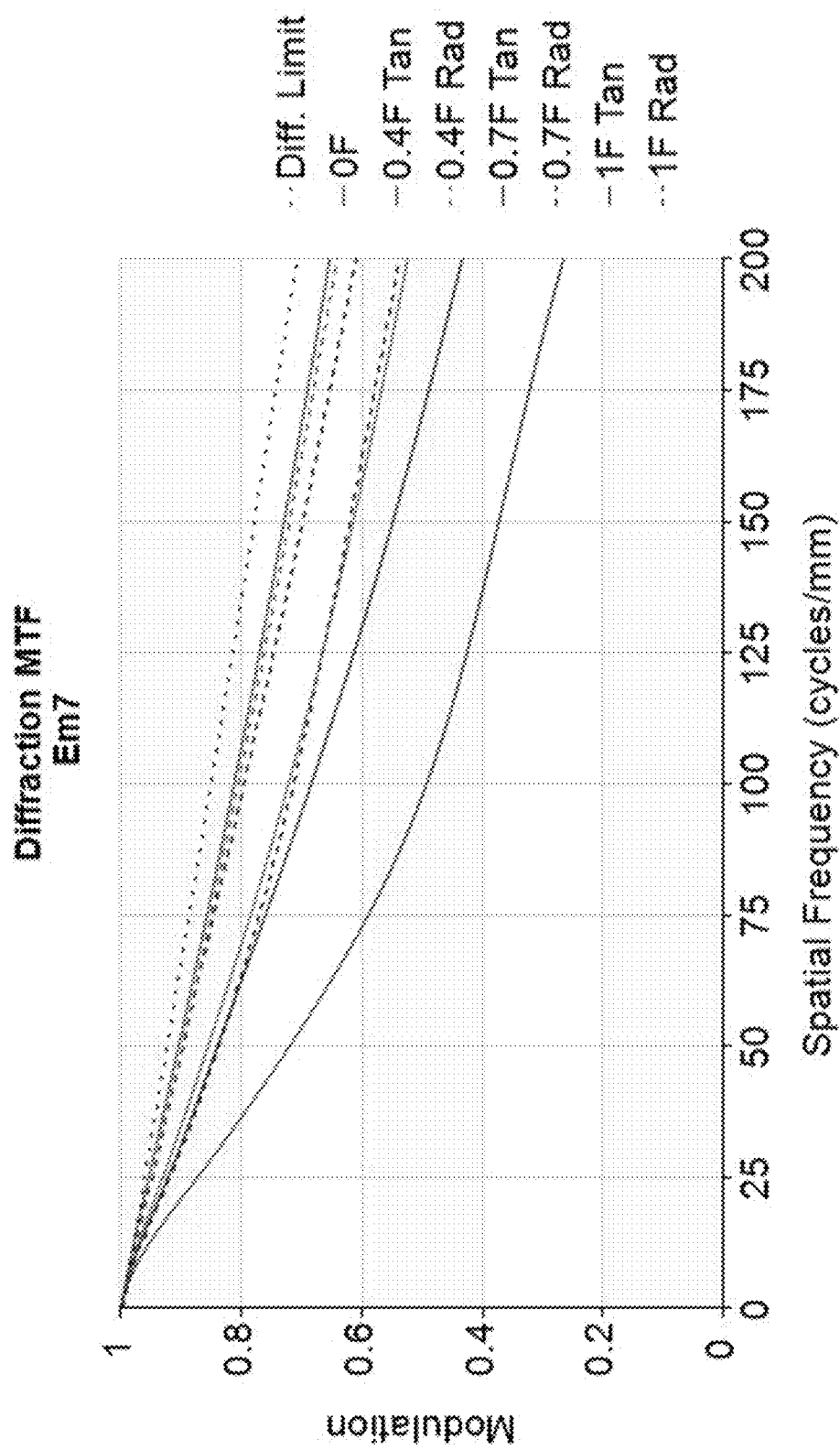
FIG. 13B is a graph illustrating the MTF for a lens system as illustrated in FIG. 13A.

As shown in FIG. 13A, lens system 1310 system may include a front aperture stop. The camera 1300 may include an IR filter located between lens element 1305 and a photosensor. Unlike other embodiments, lens system 1310 does not include a cover glass. FIG. 13B is a graph illustrating the diffraction modulation transfer function (MTF) for a lens system 1310 as illustrated in FIG. 13A, according to some embodiments.

Example Lens System 1410

Figure 14A:
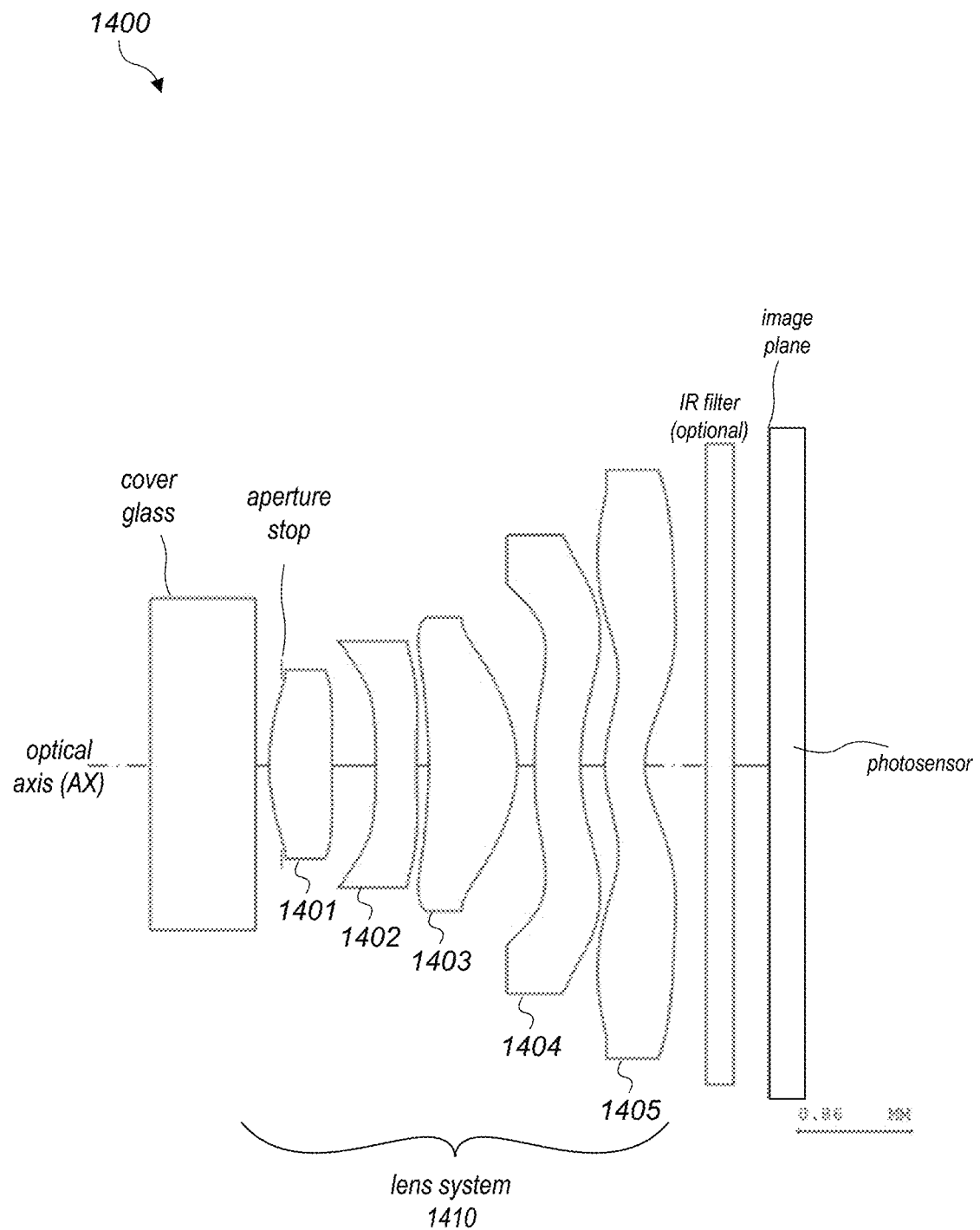
FIG. 14A is a cross-sectional illustration of an eighth embodiment of a lens system that includes five lens elements.

FIG. 14A illustrates an example camera 1400 with a lens system 1410 that includes five refractive lens elements, according to some embodiments. Lens system 1410 may have an effective focal length f of @2.61 mm, F-number of 2.0, and field of view (FOV) of 88 degrees. Lens system 1410 may include five lens elements with refractive power, arranged along an optical axis AX in order from an object side to an image side:

a first lens element 1401;

a second lens element 1402;

a third lens element 1403;

a fourth lens element 1404; and a fifth lens element 1405.

Figure 14B:
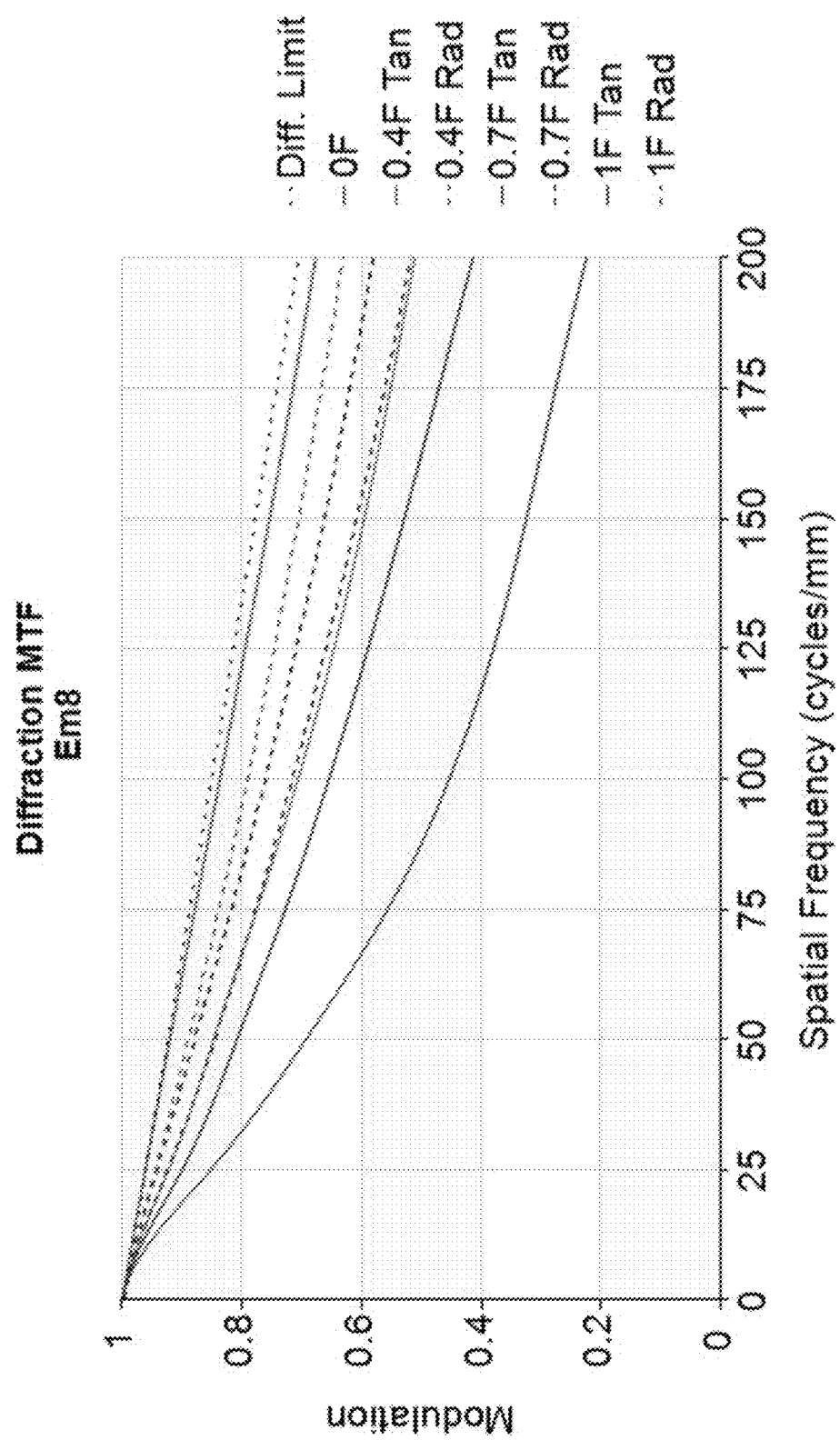
FIG. 14B is a graph illustrating the MTF for a lens system as illustrated in FIG. 14A.

As shown in FIG. 14A, lens system 1410 system may include a front aperture stop. The camera 1400 may include an IR filter located between lens element 1405 and a photosensor. A cover glass may be located on the object side of the lens system 1410. FIG. 14B is a graph illustrating the diffraction modulation transfer function (MTF) for a lens system 1410 as illustrated in FIG. 14A, according to some embodiments. Tables 4 through 6 provide details for example lens system 710.

Figure 15:
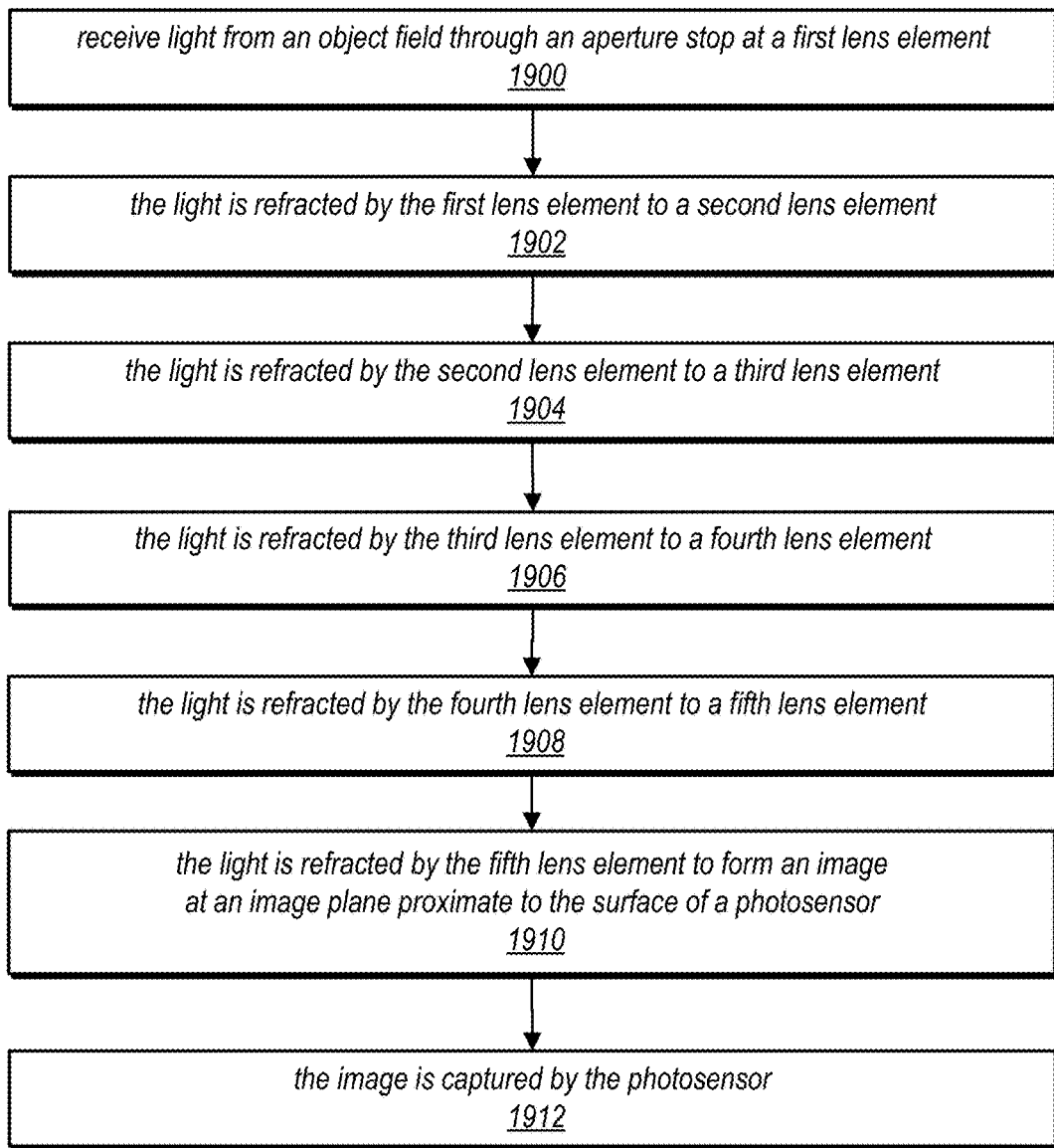
FIG. 15 is a flowchart of a method for capturing images using a camera as illustrated in FIGS. 1A through 8C, according to some embodiments.

FIG. 15 is a high-level flowchart of a method for capturing images using a camera with a lens system that includes five lens elements as illustrated in any of FIGS. 1, 7A, 8A, 9A, 10A, 11A, 12A, 13A, and 14A, according to some embodiments. As indicated at 1200, light from an object field in front of the camera is received through a front aperture stop at a first lens element of the camera. As indicated at 1902, the first lens element refracts the light to a second lens element. As indicated at 1904, the light is then refracted by the second lens element to a third lens element. As indicated at 1906, the light is then refracted by the third lens element to a fourth lens element. As indicated at 1908, the light is then refracted by the fourth lens element to a fifth lens element. As indicated at 1910, the light is refracted by the fifth lens element to form an image at an image plane at or near the surface of a photosensor. As indicated at 1912, the image is captured by the photosensor.

While not shown in FIG. 15, in some embodiments, the light may pass through an infrared filter that may for example be located between the fifth lens element and the photosensor. In some embodiments, the camera may include a cover glass located on the object side of the lens system. In some embodiments, the cover glass may have a small amount of refractive power. In some embodiments, the camera may include an optical actuator component located in front of the lens system that provides autofocus (AF) functionality for the camera.

In some embodiments, the five lens elements referred to in FIG. 15 may be configured as illustrated in any of FIGS. 7A, 8A, 9A, 10A, 11A, 12A, 13A, and 14A. However, note that variations on the examples given in the Figures and Tables are possible while achieving similar optical results.

Example Lens System Tables

The following Tables provide example values for various optical and physical parameters of the example lens systems 710 and 1410 as described in reference to FIGS. 7A and 14A, respectively. In the Tables, all dimensions are in millimeters (mm) unless otherwise specified. L1, L2, L3, L4, and L4 stand for refractive lenses 1, 2, 3, 4, and 5, respectively. The surface numbers of the elements as shown in the Tables are listed from a first surface 1 at a cover glass to a last surface at the image plane/photosensor surface. A positive radius indicates that the center of curvature is to the right (object side) of the surface. A negative radius indicates that the center of curvature is to the left (image side) of the surface. "Inf" stands for infinity (as used in optics). The thickness (or separation) is the axial distance to the next surface. Fno stands for F-number of the lens system. FFOV stands for full field of view. IRCF designates an infrared (IR) filter. Vdx is the Abbe number of a respective lens element. Both f and $f_{sys}$ stand for the effective focal length of the lens system, while fx stands for focal length of a respective lens element. R1 and R2 are radius of curvature of the object side surface and the image side surface of L1, respectively. R5 and R6 are radius of curvature of the object side surface and image side surface of L3, respectively. R7 and R8 are radius of curvature of the object side surface and the image side surface of L4, respectively. R9 and R10 are radius of curvature of the object side surface and the image side surface of L5, respectively. ΔT1 is the maximum local thickness delta of L5. ΔT2 is local thickness delta regression of L5. TTL is total track length of the lens system focusing at infinity conjugate and is measured between the object side surface of lens 1 or the aperture stop, whichever comes closer to the object, to the image plane. ImaH is the semi-diagonal image height on the image plane.

For the materials of the lens elements and IR filter, a refractive index $N_d$ at the helium d-line wavelength is provided, as well as an Abbe number $V_d$ relative to the d-line and the C- and F-lines of hydrogen. The Abbe number, $V_d$, may be defined by the equation:

$$V_d=(N_d-1)/(N_F-N_C),$$

where $N_F$ and $N_C$ are the refractive index values of the material at the F and C lines of hydrogen, respectively.

Referring to the Tables of aspheric coefficients (Tables 2A-2B and 5A-5B), the aspheric equation describing an aspherical surface may be given by:

$$Z=(cr^2/(1+\sqrt{1-(1+K)c^2r^2}))+A_4r^4+A_6r^6+A_8r^8+A_{10}r^{10}+A_{12}R^{12}+A_{14}r^{14}+A_{16}r^{16}+A_{18}r^{18}+A_{20}r^{20}$$

where Z is the sag of surface parallel to the z-axis (the z-axis and the optical axis are coincident in these example embodiments), r is the radial distance from the vertex, c is the curvature at the pole or vertex of the surface (the reciprocal of the radius of curvature of the surface), K is the conic constant, and $A_4$-$A_{20}$ are the aspheric coefficients. In the Tables, "E" denotes the exponential notation (powers of 10).

Note that the values given in the following Tables for the various parameters in the various embodiments of the lens system are given by way of example and are not intended to be limiting. For example, one or more of the parameters for one or more of the surfaces of one or more of the lens elements in the example embodiments, as well as parameters for the materials of which the elements are composed, may be given different values while still providing similar performance for the lens system. In particular, note that some values in the Tables may be scaled up or down for larger or smaller implementations of a camera using an embodiment of a lens system as described herein.

TABLE 1

Example lens system 710
Lens system 710
Fno = 2.0, FFOV = 95.0 deg

| Element | Surface # | Radius (mm) | Thickness or separation (mm) | Refractive Index $N_d$ | Abbe Number $V_d$ |
|---|---|---|---|---|---|
| Cover.W | 1 | Inf | 0.800 | 1.525 | 54.5 |
|  | 2 | −194.000 | 0.150 |  |  |
|  | 3 | Inf | 0.055 |  |  |
| Stop | 4 | Inf | −0.055 |  |  |
| L1 | *5 | 2.049 | 0.527 | 1.545 | 56.0 |
|  | *6 | −182.726 | 0.231 |  |  |
| L2 | *7 | 33.602 | 0.251 | 1.678 | 19.5 |
|  | *8 | 6.457 | 0.098 |  |  |
| L3 | *9 | −3.661 | 0.876 | 1.545 | 56.0 |
|  | *10 | −0.989 | 0.050 |  |  |
| L4 | *11 | 4.898 | 0.350 | 1.678 | 19.5 |
|  | *12 | 2.044 | 0.097 |  |  |
| L5 | *13 | 0.777 | 0.301 | 1.545 | 56.0 |
|  | *14 | 0.592 | 0.386 |  |  |
| IRCF | 15 | Inf | 0.210 | 1.517 | 64.2 |
|  | 16 | Inf | 0.475 |  |  |
| Sensor | 17 | Inf | 0 |  |  |

*Annotates aspheric surfaces (aspheric coefficient given below in Tables 2A and 2B)

TABLE 2A

Lens system 710, Aspheric Coefficients

| Surface | 5 | 6 | 7 | 8 | 9 |
|---|---|---|---|---|---|
| K | 0.00000E+00 | 0.00000E+00 | 0.00000E+00 | 0.00000E+00 | 0.00000E+00 |
| A4 | −7.54068E−02 | −2.24360E−01 | −5.63451E−01 | −4.24662E−01 | −2.33007E−01 |
| A6 | 2.31315E−01 | −2.45325E−01 | 5.60572E−01 | 1.44087E+00 | 2.12497E+00 |
| A8 | −1.64698E+00 | 2.65302E−01 | −5.39081E+00 | −6.99290E+00 | −8.17804E+00 |
| A10 | 4.43718E+00 | −9.03303E−01 | 1.55628E+01 | 1.70595E+01 | 1.66612E+01 |

TABLE 2A-continued

Lens system 710, Aspheric Coefficients

| Surface | 5 | 6 | 7 | 8 | 9 |
|---|---|---|---|---|---|
| A12 | −6.54981E+00 | 1.04281E+00 | −2.34623E+01 | −2.35796E+01 | −1.95817E+01 |
| A14 | 3.03756E+00 | −9.50420E−01 | 1.62935E+01 | 1.89485E+01 | 1.36595E+01 |
| A16 | 0.00000E+00 | −1.70912E−01 | −3.65427E+00 | −8.32376E+00 | −5.30161E+00 |
| A18 | 0.00000E+00 | 0.00000E+00 | 0.00000E+00 | 1.56115E+00 | 8.86355E−01 |
| A20 | 0.00000E+00 | 0.00000E+00 | 0.00000E+00 | 0.00000E+00 | 0.00000E+00 |

TABLE 2B

Lens system 710, Aspheric Coefficients

| Surface | 10 | 11 | 12 | 13 | 14 |
|---|---|---|---|---|---|
| K | −1.00000E+00 | 0.00000E+00 | −1.00000E+00 | −1.00000E+00 | −1.00000E+00 |
| A4 | −1.94019E−02 | 1.15599E−01 | 3.86776E−02 | −8.16695E−01 | −1.10499E+00 |
| A6 | 2.13740E−02 | −4.57601E−01 | −3.41815E−01 | 3.87565E−01 | 1.06232E+00 |
| A8 | −5.74570E−02 | 7.41619E−01 | 4.14133E−01 | −6.40573E−02 | −8.03080E−01 |
| A10 | 2.20338E−01 | −9.74199E−01 | −3.19359E−01 | −1.08281E−03 | 4.41832E−01 |
| A12 | −4.25957E−01 | 8.56136E−01 | 1.56504E−01 | −4.48342E−03 | −1.65942E−01 |
| A14 | 3.86038E−01 | −4.80696E−01 | −4.53415E−02 | 4.16376E−03 | 4.07746E−02 |
| A16 | −1.13319E−01 | 1.55943E−01 | 7.05167E−03 | −1.24009E−03 | −6.23311E−03 |
| A18 | 2.24867E−03 | −2.17562E−02 | −4.55397E−04 | 1.68211E−04 | 5.36585E−04 |
| A20 | 0.00000E+00 | 0.00000E+00 | 0.00000E+00 | −8.92759E−06 | −1.98606E−05 |

TABLE 3

Lens system 710, Optical Definitions

| | | | |
|---|---|---|---|
| f[mm] | 2.399 | Vd4 | 19.5 |
| Fno | 2.0 | fsys/f4 | −0.440 |
| FFOV[deg] | 95° | (R7 + R8)/(R7 − R8) | 2.433 |
| TTL/(2*ImaH) | 0.764 | Vd5 | 56.0 |
| Vd1 | 56.0 | |fsys/f5| | 0.225 |
| |fsys/f1| | 0.646 | (R9 + R10)/(R9 − R10) | 7.383 |
| |R1 + R2|/|R1 − R2| | 0.978 | ΔT2/ΔT1 | 0.63 |
| |fsys/f2| | 0.203 | Ym/SD | 0.57 |
| |fsys/f3| | 1.080 | Y4/SD | 0.42 |
| |R5 + R6|/|R5 − R6| | 1.740 | | |

TABLE 4

Example lens system 1410
Lens system 1410
Fno = 2.0, FFOV = 88.0 deg

| Element | Surface # | Radius (mm) | Thickness or separation (mm) | Refractive Index $N_d$ | Abbe Number $V_d$ |
|---|---|---|---|---|---|
| Cover.W | 1 | Inf | 0.800 | 1.525 | 54.5 |
| | 2 | −194.000 | 0.150 | | |
| | 3 | Inf | 0.093 | | |
| Stop | 4 | Inf | −0.093 | | |
| L1 | *5 | 1.644 | 0.475 | 1.545 | 56.0 |
| | *6 | 14.907 | 0.331 | | |
| L2 | *7 | −13.821 | 0.308 | 1.678 | 19.5 |
| | *8 | 8.973 | 0.094 | | |
| L3 | *9 | −3.585 | 0.683 | 1.545 | 56.0 |
| | *10 | −1.021 | 0.132 | | |
| L4 | *11 | 5.795 | 0.351 | 1.661 | 20.4 |
| | *12 | 2.521 | 0.181 | | |
| L5 | *13 | 1.019 | 0.304 | 1.545 | 56.0 |
| | *14 | 0.683 | 0.463 | | |
| IRCF | 15 | Inf | 0.210 | 1.517 | 64.2 |
| | 16 | Inf | 0.267 | | |
| Sensor | 17 | Inf | 0.000 | | |

*Annotates aspheric surfaces (aspheric coefficient given below in Tables 5A and 5B)

TABLE 5A

Lens system 1410, Aspheric Coefficients

| Surface | 5 | 6 | 7 | 8 | 9 |
|---|---|---|---|---|---|
| K | 0.00000E+00 | 0.00000E+00 | 0.00000E+00 | 0.00000E+00 | 0.00000E+00 |
| A4 | −6.24275E−02 | −1.37057E−01 | −3.59915E−01 | −2.13554E−01 | −4.52048E−02 |
| A6 | 2.23284E−01 | −4.23746E−01 | −4.39085E−01 | 5.07277E−01 | 1.51194E+00 |
| A8 | −1.63066E+00 | 2.19635E+00 | 1.88564E+00 | −2.11887E+00 | −5.57055E+00 |
| A10 | 4.40169E+00 | −9.80697E+00 | −7.83224E+00 | 2.76632E+00 | 8.74391E+00 |
| A12 | −6.56826E+00 | 2.24440E+01 | 1.63691E+01 | −5.19544E−01 | −6.55745E+00 |
| A14 | 3.40374E+00 | −2.68699E+01 | −1.39927E+01 | −1.03380E+00 | 2.18277E+00 |
| A16 | 0.00000E+00 | 1.29431E+01 | 3.99334E+00 | 4.90923E−01 | −2.00090E−01 |

TABLE 5A-continued

Lens system 1410, Aspheric Coefficients

| Surface | 5 | 6 | 7 | 8 | 9 |
|---|---|---|---|---|---|
| A18 | 0.00000E+00 | 0.00000E+00 | 0.00000E+00 | 0.00000E+00 | 0.00000E+00 |
| A20 | 0.00000E+00 | 0.00000E+00 | 0.00000E+00 | 0.00000E+00 | 0.00000E+00 |

TABLE 5B

Lens system 1410, Aspheric Coefficients

| Surface | 10 | 11 | 12 | 13 | 14 |
|---|---|---|---|---|---|
| K | −1.00000E+00 | 0.00000E+00 | −1.00000E+00 | −1.00000E+00 | −1.00000E+00 |
| A4 | 3.64445E−01 | 5.94928E−01 | 5.18526E−01 | −5.93494E−01 | −1.03243E+00 |
| A6 | −1.05724E+00 | −1.70827E+00 | −1.81221E+00 | −2.54816E−01 | 9.35381E−01 |
| A8 | 1.83472E+00 | 2.07367E+00 | 2.73183E+00 | 8.81176E−01 | −6.39242E−01 |
| A10 | −1.88816E+00 | −1.04015E+00 | −2.59519E+00 | −7.33021E−01 | 3.29479E−01 |
| A12 | 1.14633E+00 | −6.33299E−01 | 1.61912E+00 | 3.27849E−01 | −1.20446E−01 |
| A14 | −3.45145E−01 | 1.34852E+00 | −6.60214E−01 | −8.82522E−02 | 2.93661E−02 |
| A16 | 4.11800E−02 | −9.22652E−01 | 1.69072E−01 | 1.43255E−02 | −4.48247E−03 |
| A18 | 0.00000E+00 | 3.08356E−01 | −2.45783E−02 | −1.29522E−03 | 3.85358E−04 |
| A20 | 0.00000E+00 | −4.18203E−02 | 1.53972E−03 | 5.01917E−05 | −1.42048E−05 |

TABLE 6

Lens system 1410, Optical Definitions

| f[mm] | 2.613 | Vd4 | 20.4 |
|---|---|---|---|
| Fno | 2.0 | fsys/f4 | −0.374 |
| FFOV[deg] | 88° | (R7 + R8)/(R7 − R8) | 2.540 |
| TTL/(2*ImaH) | 0.754 | Vd5 | 56.0 |
| Vd1 | 56.0 | |fsys/f5| | 0.489 |
| |fsys/f1| | 0.782 | (R9 + R10)/(R9 − R10) | 5.059 |
| |R1 + R2|/|R1 − R2| | 1.248 | ΔT2/ΔT1 | 0.50 |
| |fsys/f2| | 0.327 | Ym/SD | 0.59 |
| |fsys/f3| | 1.094 | Y4/SD | 0.4 |
| |R5 + R6|/|R5 − R6| | 1.796 | | |

Example Computing Device

Figure 16:
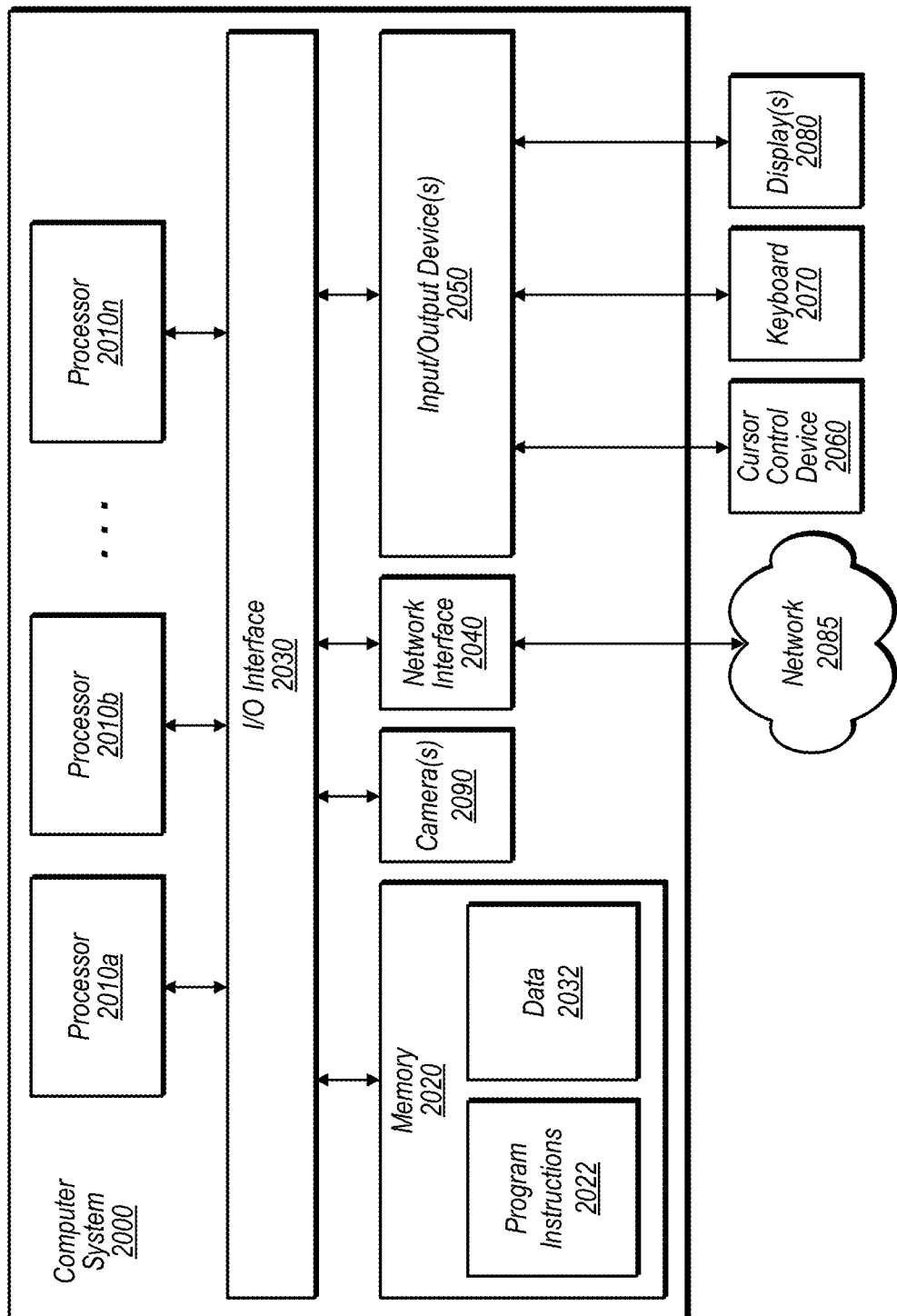
FIG. 16 illustrates an example computer system that may be used in embodiments.

FIG. 16 illustrates an example computing device, referred to as computer system 2000, that may include or host embodiments of a camera with a lens system as illustrated in FIGS. 1 through 15. In addition, computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1 through 15, which may also be coupled to I/O interface 2030, or one or more cameras as described above with respect to FIGS. 1 through 15 along with one or more other cameras such as conventional wide-field cameras.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 16, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A lens system, comprising:
 a plurality of optical elements arranged along an optical axis of the lens system, wherein the plurality of optical elements includes, in order along the optical axis from an object side to an image side of the lens system:
 a front aperture stop;
 a first refractive lens element L1;
 a second refractive lens element L2;

a third refractive lens element L3;
a fourth refractive lens element L4; and
a fifth refractive lens element L5;
wherein F-number of the lens system is less than or equal to 2.4, and full field of view of the lens system is greater than or equal to 82 degrees;
wherein respective Abbe numbers for L1, L3 and L5 are higher than respective Abbe numbers for L2 and L4; and
wherein L5 satisfies the relationships:

$|fsys/f5|<0.55$ $(R9+R10)/(R9-R10)>4$ where fsys is effective focal length of the lens system, f5 is effective focal length of L5, and R9 and R10 are radius of curvature of an object side surface and an image side surface of L5, respectively.

2. The lens system as recited in claim 1, wherein the lens system satisfies the relationship:

$TTL/2SD<0.85$, where TTL is total track length of the lens system, and SD is semi-diagonal image height at an image plane of the lens system.

3. The lens system as recited in claim 1, wherein effective focal length f of the lens system is less than 3 mm.

4. The lens system as recited in claim 1, wherein total track length of the lens system is less than 4 mm.

5. The lens system as recited in claim 1, wherein L1 has positive refractive power, wherein an object side surface of L1 is convex in a paraxial region, and wherein L1 comprises a material with an Abbe number vd1, where 45<vd1<70.

6. The lens system as recited in claim 1, wherein L1 satisfies the relationships:

$|fsys/f1|>0.5$, and $0.8<|R1+R2|/|R1-R2|<1.5$, where fsys is effective focal length of the lens system, f1 is effective focal length of L1, and R1 and R2 are radius of curvature of an object side surface and an image side surface of L1, respectively.

7. The lens system as recited in claim 1, wherein L2 has negative refractive power, wherein an object side surface of L2 is convex in a paraxial region, and wherein L2 comprises a material with an Abbe number vd2, where 15<vd2<30.

8. The lens system as recited in claim 1, wherein L2 satisfies the relationship:

$|fsys/f2|<0.5$, where fsys is effective focal length of the lens system, and f2 is effective focal length of L2.

9. The lens system as recited in claim 1, wherein L3 has positive refractive power, wherein an object side surface of L3 is concave in a paraxial region, and wherein an image side surface of L3 is convex in a paraxial region.

10. The lens system as recited in claim 1, wherein L3 satisfies the relationships:

$|fsys/f3|>0.5$;

$|R5+R6|/|R5-R6|<4$ where fsys is effective focal length of the lens system, f3 is effective focal length of L3, and R5 and R6 are radius of curvature of an object side surface and an image side surface of L3, respectively.

11. The lens system as recited in claim 1, wherein L4 has negative refractive power, wherein an object side surface of L4 is aspheric and has at least one part being concave, wherein an image side surface of L4 is concave in a paraxial region and has at least one part being convex, and wherein L4 comprises a material with an Abbe number vd4, where 15<vd4<30.

12. The lens system as recited in claim 1, wherein, L4 satisfies the relationships:

$-0.8<fsys/f4<-0.2$ $1<(R7+R8)/(R7-R8)<4$ where fsys is effective focal length of the lens system, f4 is effective focal length of L4, and R7 and R8 are radius of curvature of an object side surface and an image side surface of L4, respectively.

13. The lens system as recited in claim 1, wherein L5 has refractive power, wherein an object side surface of L5 is aspheric and convex in a paraxial region, wherein an image side surface of L5 is aspheric and concave in a paraxial region, and wherein L5 comprises a material with an Abbe number vd5, where 45<vd5<70.

14. The lens system as recited in claim 1, wherein local curvature of an object side surface of L5 crosses 0 from positive to negative or from negative to positive at least twice from a center of L5 to an edge of L5.

15. The lens system as recited in claim 1, wherein L5 satisfies the relationship:

$\Delta T2/\Delta T1>0.3$, where ΔT1 is maximum local thickness delta along L5, and ΔT2 is maximum regression in local thickness delta within a lens section defined in a range from a point where maximum local thickness delta is reached to a maximum clear aperture of L5.

16. The lens system as recited in claim 1, wherein L5 satisfies the relationship:

$0.3<Ym/SD<0.7$, where Ym is height, from the optical axis, of a point where maximum local thickness of L5 occurs, and SD is semi-diagonal image height.

17. The lens system as recited in claim 1, wherein L4 and L5 satisfy the relationships:

$0.1<Y4/SD<0.6$, and $Y4<Ym$, where Y4 is height, from the optical axis, of a point at which an aspheric inflection point of an image side surface of L4 occurs, SD is semi-diagonal image height, and Ym is height, from the optical axis, of a point where maximum local thickness of L5 occurs.

18. The lens system as recited in claim 1, wherein the lens system further includes one or more of:
a cover glass located on an object side of L1;
an infrared filter located on an image side of L5; or
an optical actuator located on an object side of L1 that provides autofocus functionality for the lens system.

19. A camera, comprising:
a photosensor configured to capture light projected onto a surface of the photosensor; and
a front aperture lens system configured to refract light from an object field located in front of the camera to form an image of a scene at an image plane at or near the surface of the photosensor, wherein the lens system includes five refractive lens elements L1, L2, L3, L4, L5 arranged in order along an optical axis from a first lens element L1 on an object side of the camera to a fifth lens element L5 on an image side of the camera;

wherein F-number of the lens system is less than or equal to 2.4, full field of view of the lens system is greater than or equal to 82 degrees, and wherein the lens system satisfies the relationship:

$$TTL/2SD<0.85,$$

where TTL is total track length of the lens system, and SD is semi-diagonal image height at an image plane of the lens system;

wherein respective Abbe numbers for L1, L3 and L5 are higher than respective Abbe numbers for L2 and L4; and wherein L5 satisfies the relationships:

$$|fsys/f5|<0.55$$

$$(R9+R10)/(R9-R10)>4$$

where fsys is effective focal length of the lens system, f5 is effective focal length of L5, and R9 and R10 are radius of curvature of an object side surface and an image side surface of L5, respectively.

20. A device, comprising:

one or more processors;

one or more cameras; and a memory comprising program instructions executable by at least one of the one or more processors to control operations of the one or more cameras;

wherein at least one of the one or more cameras is a camera comprising:

a photosensor configured to capture light projected onto a surface of the photosensor; and a front aperture lens system configured to refract light from an object field located in front of the camera to form an image of a scene at an image plane at or near the surface of the photosensor, wherein the lens system includes five refractive lens elements L1, L2, L3, L4, L5 arranged in order along an optical axis from a first lens element L1 on an object side of the camera to a fifth lens element L5 on an image side of the camera;

wherein F-number of the lens system is less than or equal to 2.4, full field of view of the lens system is greater than or equal to 82 degrees, and wherein the lens system satisfies the relationship:

$$TTL/2SD<0.85,$$

where TTL is total track length of the lens system, and SD is semi-diagonal image height at an image plane of the lens system;

wherein respective Abbe numbers for L1, L3 and L5 are higher than respective Abbe numbers for L2 and L4; and wherein L5 satisfies the relationships:

$$|fsys/f5|<0.55$$

$$(R9+R10)/(R9-R10)>4$$

where fsys is effective focal length of the lens system, f5 is effective focal length of L5, and R9 and R10 are radius of curvature of an object side surface and an image side surface of L5, respectively.

* * * * *